(12) United States Patent
Kiyose et al.

(10) Patent No.: US 9,057,477 B2
(45) Date of Patent: Jun. 16, 2015

(54) PROJECTION DISPLAY SYSTEM AND ATTACHING DEVICE

(75) Inventors: Kanechika Kiyose, Matsumoto (JP); Yasunori Onishi, Shiojiri (JP)

(73) Assignee: Seiko Epson Corporation (JP)

( * ) Notice: Subject to any disclaimer, the term of this patent is extended or adjusted under 35 U.S.C. 154(b) by 1065 days.

(21) Appl. No.: 13/096,502

(22) Filed: Apr. 28, 2011

(65) Prior Publication Data

US 2011/0291990 A1 Dec. 1, 2011

(30) Foreign Application Priority Data

May 26, 2010 (JP) ................................ 2010-120205

(51) Int. Cl.
*F16M 13/02* (2006.01)
*G06F 3/041* (2006.01)
*G06F 3/042* (2006.01)

(52) U.S. Cl.
CPC .............. *F16M 13/02* (2013.01); *G06F 3/0425* (2013.01); *G06F 3/0418* (2013.01); *G06F 3/0428* (2013.01)

(58) Field of Classification Search
None
See application file for complete search history.

(56) References Cited

U.S. PATENT DOCUMENTS

| | | | |
|---|---|---|---|
| 6,379,012 B1 * | 4/2002 | Enochs et al. | 353/79 |
| 6,414,672 B2 * | 7/2002 | Rekimoto et al. | 345/173 |
| 6,512,507 B1 * | 1/2003 | Furihata et al. | 345/157 |
| 2003/0193657 A1 * | 10/2003 | Uomori et al. | 356/3.1 |
| 2004/0183775 A1 * | 9/2004 | Bell | 345/156 |
| 2005/0117197 A1 * | 6/2005 | Ide | 359/291 |
| 2006/0007185 A1 * | 1/2006 | Kobayashi | 345/176 |
| 2006/0231794 A1 | 10/2006 | Sakaguchi et al. | |

FOREIGN PATENT DOCUMENTS

| | | |
|---|---|---|
| JP | 11-345085 | 12/1999 |
| JP | 2001-125741 A | 5/2001 |
| JP | 2001-142643 | 5/2001 |
| JP | 2006-003414 A | 1/2006 |
| JP | 2006-244192 A | 9/2006 |
| JP | 2006-319950 A | 11/2006 |
| JP | 2009-008537 | 1/2009 |

\* cited by examiner

*Primary Examiner* — Jesus Hernandez
(74) *Attorney, Agent, or Firm* — Harness, Dickey & Pierce, P.L.C.

(57) ABSTRACT

A projection display system includes: an image projection device projecting an image on a projection surface; an optical detecting device; and an attaching device, wherein the optical detecting device includes an irradiating section emitting an irradiation light toward a detection region which is set along the projection surface, a light receiving section receiving a reflected light generated as a result of the irradiation light being reflected from the object, and a detecting section detecting position information of the object based on the result of the light received by the light receiving section, and the attaching device includes a first attaching section attached to a support supporting the attaching device, a second attaching section attached to the image projection device, and a third attaching section attached to the optical detecting device.

7 Claims, 18 Drawing Sheets

PROJECTION DISPLAY SYSTEM AND ATTACHING DEVICE

BACKGROUND

1. Technical Field

The present invention relates to attaching devices and projection display devices etc.

2. Related Art

In recent years, in electronic equipment such as a cellular telephone, a personal computer, a car navigation device, a ticket-vending machine, and a bank terminal, a display device having a position detecting function, the display device provided with a display section having a front face on which a touch panel is placed, has been used. This display device allows the user to point at an icon or the like in a display image or input information while referring to an image displayed on the display section. As a position detecting method using such a touch panel, a method using a resistive touch panel or a capacitive touch panel, for example, has been known.

On the other hand, the display area of a projection display device using an image projection device (a projector) is wider than that of the display device of the cellular telephone or the personal computer. Therefore, it is difficult to realize position detection by using the above-described resistive touch panel or capacitive touch panel in the projection display device.

Moreover, as a method for realizing position detection in the projection display device, there may be a method by which a position detecting device which can optically detect the position of an object is built into a housing of the image projection device. However, with this method, there is a possibility that the housing of the image projection device increases in size, resulting in an increase in the cost of parts, for example.

Furthermore, as an existing technique related to a position detecting device for a projection display device, the techniques disclosed in JP-A-11-345085 and JP-A-2001-142643, for example, have been known. However, such a position detecting device has problems such as an undesirably large system.

SUMMARY

An advantage of some aspects of the invention is to provide an attaching device and a projection display device etc. which can realize object position detection etc. in an image projection device.

An aspect of the invention is directed to an attaching device of an image projection device, the attaching device including a first attaching section for attaching the attaching device to an attachment object to which a device is to be attached, a second attaching section for attaching the image projection device projecting an image on a projection surface, and a third attaching section for attaching an optical detecting device detecting an object in a detection region which is set along the projection surface.

According to the aspect of the invention, the attaching device has the first, second, and third attaching sections. In addition, it is possible to attach the attaching device to the attachment object to which a device is to be attached, such as a ceiling or a wall, by the first attaching section and attach the image projection device to the attaching device by the second attaching section. Furthermore, according to the aspect of the invention, it is possible to attach the optical detecting device to the attaching device by the third attaching section and detect, by using the optical detecting device, the object in the detection region which is set along the projection surface.

This makes it possible to realize object position detection etc. in the image projection device. Moreover, according to the aspect of the invention, it is possible to attach the image projection device and the optical detecting device integrally to the attachment object to which a device is to be attached, such as a ceiling or a wall, by the attaching device. Therefore, it is possible to fix the positional relationship between the image projection device and the optical detecting device. This makes it easy to ensure the detection accuracy etc. of the optical detecting device.

Moreover, according to the aspect of the invention, the image projection device may have a heat dissipation section for dissipating heat to the outside, and the optical detecting device may be attached, by the third attaching section, to a region in which the heat dissipation section is not placed.

By doing so, it is possible to prevent a reduction in the detection accuracy etc. of the optical detecting device due to heated air etc. from the heat dissipation section.

Furthermore, according to the aspect of the invention, the attaching device may include an incident light regulating section regulating the entrance of a light in an incident direction intersecting the plane of the detection region into the optical detecting device.

By doing so, it is possible to prevent a reduction in the detection accuracy etc. of the optical detecting device as a result of the light in the incident direction intersecting the plane of the detection region (the plane along the projection surface) entering the optical detecting device.

In addition, according to the aspect of the invention, the incident light regulating section may regulate the entrance of a reflected light into the optical detecting device, the reflected light generated as a result of a projection light from the image projection device being reflected from the projection surface or the reflected light generated as a result of an irradiation light from the optical detecting device being reflected from the projection surface or the image projection device.

By doing so, it is possible to prevent a reduction in the detection accuracy etc. of the optical detecting device due to the entrance of the reflected light into the optical detecting device, the reflected light generated as a result of the projection light from the image projection device being reflected from the projection surface or the reflected light generated as a result of the irradiation light from the optical detecting device being reflected from the projection surface or the image projection device.

Moreover, according to the aspect of the invention, the incident light regulating section may be an incident light slit having a slit surface in a direction along the plane of the detection region.

By providing such an incident light slit, it is possible to regulate effectively the entrance of the light in the incident direction intersecting the plane of the detection region into the optical detecting device.

Furthermore, according to the aspect of the invention, an antireflective layer or a depressed section may be provided on the slit surface.

By providing an antireflective layer or a depressed section on the slit surface, it is possible to regulate the entrance of the light reflected from the slit surface into the optical detecting device and thereby prevent a reduction in the detection accuracy etc. of the optical detecting device more effectively.

In addition, according to the aspect of the invention, the incident light slit may have a first slit surface and a second slit surface which are provided so as to sandwich the optical detecting device as the slit surface.

By doing so, it is possible to regulate the entrance of the light in the incident direction intersecting the plane of the detection region into the optical detecting device on both the first slit surface and the second slit surface.

Moreover, according to the aspect of the invention, the optical detecting device may have an irradiation light slit regulating an irradiation light for detecting the object, the irradiation light emitted from the optical detecting device, such that the irradiation light travels in a direction along the plane of the detection region, and, when the height from the third attaching section to an end of the incident light slit is HS1 and the height from the third attaching section to an end of the irradiation light slit is HS2, HS1>HS2 may hold.

By doing so, the direction of the irradiation light from the optical detecting device is regulated by the irradiation light slit such that the irradiation light travels in a direction along the plane of the detection region. Moreover, the irradiation light whose irradiation direction is displaced is regulated due to the presence of the incident light slit, such that the irradiation light does not travel toward the image projection device or the projection surface. This makes it possible to regulate the entrance of the reflected light reflected from the image projection device or the projection surface into the optical detecting device.

Furthermore, according to the aspect of the invention, the attaching device may further include the optical detecting device attached by the third attaching section, and the optical detecting device may include an irradiating section emitting an irradiation light toward the detection region, the irradiation light for detecting the object, a light receiving section receiving a reflected light generated as a result of the irradiation light being reflected from the object, and a detecting section detecting position information of the object based on the result of the light received by the light receiving section.

By doing so, the irradiating section emits the irradiation light, the light receiving section receives the reflected light generated as a result of the irradiation light being reflected from the object, and the position information of the object can be detected based on the result of the received light. Therefore, it is possible to realize detection of the object in the image projection device with a relatively small configuration.

In addition, according to the aspect of the invention, the irradiating section may emit irradiation lights with different intensities in accordance with the position in the detection region.

By doing so, the intensity of the reflected light reflected from the object changes according to the position of the object in the detection region, whereby it is possible to detect the position, the direction, etc. in which the object is located.

Moreover, according to the aspect of the invention, the irradiating section may include a light source section emitting a source light, a light guide which is curved and guides the source light from the light source section along a curved light guiding path, and an irradiation direction setting section receiving the source light exiting from an outer circumferential side of the light guide and setting an irradiation direction of the irradiation light such that the irradiation light travels from an inner circumferential side to the outer circumferential side of the curved light guide.

According to the aspect of the invention, the source light from the light source section is guided along the curved light guiding path of the light guide. In addition, the source light exiting from the outer circumferential side of the light guide is made to exit as an irradiation light traveling from the inner circumferential side to the outer circumferential side of the light guide. When the exiting light is reflected from the object, the reflected light is received by the light receiving section, and the direction etc. in which the object is located is detected based on the result of the received light. Therefore, since the irradiation light is made to exit radially from the inner circumferential side to the outer circumferential side of the light guide and the object is detected based on the reflected light generated as a result of the irradiation light being reflected from the object, it is possible to sense the object in a wide range.

Moreover, according to the aspect of the invention, the optical detecting device may have a first irradiating section and a second irradiating section as the irradiating section, the first irradiating section may radially emit first irradiation lights with different intensities in accordance with the irradiation direction, the second irradiating section may radially emit second irradiation lights with different intensities in accordance with the irradiation direction, the light receiving section may receive a first reflected light generated as a result of the first irradiation light from the first irradiating section being reflected from the object and a second reflected light generated as a result of the second irradiation light from the second irradiating section being reflected from the object, and the detecting section may detect the position of the object based on the result of the light received by the light receiving section.

According to the aspect of the invention, the first irradiation lights with different intensities in accordance with the irradiation direction are radially emitted from the first irradiating section, and the second irradiation lights with different intensities in accordance with the irradiation direction are radially emitted from the second irradiating section. Then, the first reflected light generated as a result of the first irradiation light being reflected from the object and the second reflected light generated as a result of the second irradiation light being reflected from the object are received by the light receiving section, and the position of the object is detected based on the result of the received light. Therefore, since the position of the object can be detected by using the first reflected light generated as a result of the radially-emitted first irradiation light being reflected from the object and the second reflected light generated as a result of the radially-emitted second irradiation light being reflected from the object, it is possible to detect the position of the object in a wide range.

Furthermore, according to the aspect of the invention, the detecting section may detect position information of the object in the detection region after the image projection device projects an image of a screen for calibration on the projection surface, and the optical detecting device may transmit the detected position information of the object to the image projection device or an information processor controlling the image projection device.

By doing so, when, for example, the user performs operation according to an instruction on the screen for calibration while viewing the image of the screen for calibration projected on the projection surface, the position information of an object such as a finger of the user or a touch pen is detected. Then, the detected position information is transmitted to the image projection device or the information processor. Therefore, it is possible to perform calibration processing by using the position information of the object, the information obtained when the image of the screen for calibration is projected, and improve the detection accuracy etc. of the optical detecting device.

In addition, according to the aspect of the invention, the optical detecting device may include an interface section, and the optical detecting device may transmit information for calibration via the interface section.

By doing so, the optical detecting device can transmit the information for calibration such as a program product for calibration and detected position information at the time of calibration to the image projection device, the information processor controlling the image projection device, or the like, via the interface section. This makes it possible to perform calibration processing efficiently.

Moreover, according to the aspect of the invention, the optical detecting device may receive a power supply from the image projection device via the interface section.

By doing so, the optical detecting device can operate by the power supply from the image projection device by making effective use of the interface section performing interface processing between the optical detecting device and the image projection device.

Another aspect of the invention relates to a projection display device including the attaching device described above and the image projection device attached to the attaching device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a preferred embodiment of the invention will be described in detail. It should be understood that the embodiment described below is not meant to limit unduly the scope of the invention claimed in the appended claims in any way, and all the configurations described in the embodiment are not always necessary for means for solving the problems.

1. Configuration of Attaching Device

Figure 1:
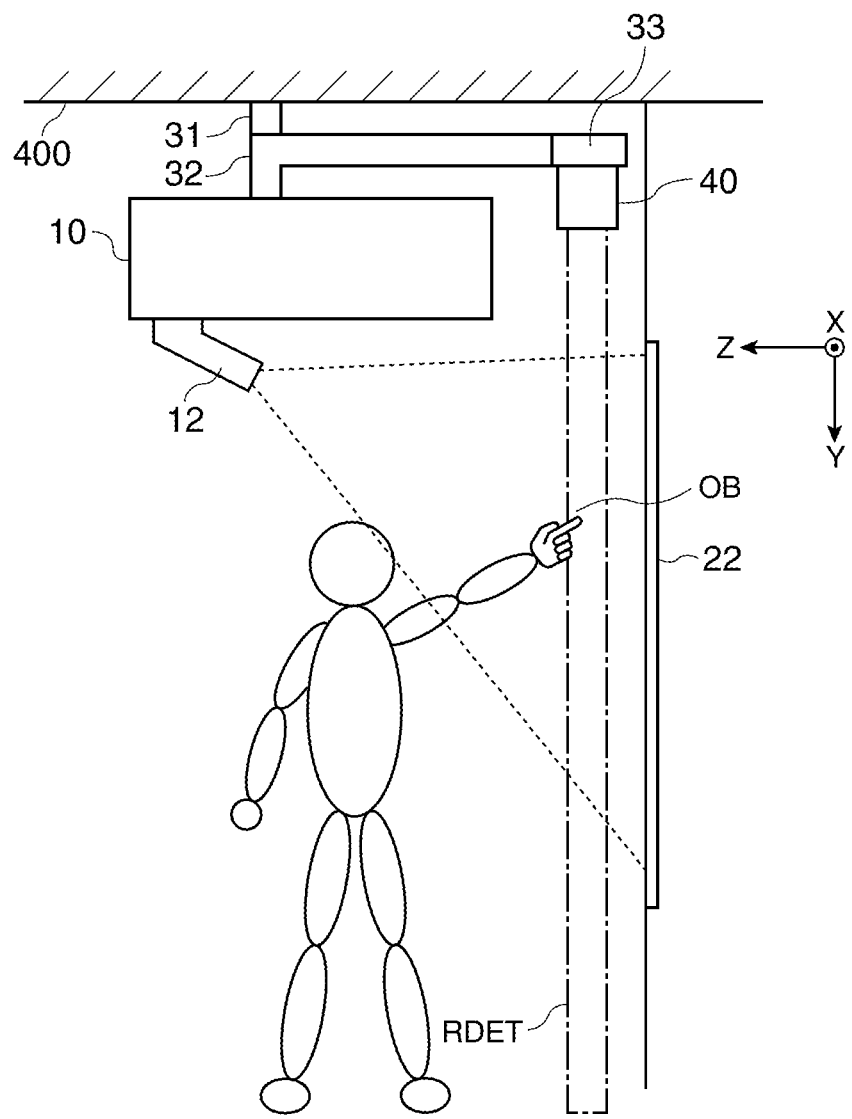
FIG. 1 shows a configuration example of an attaching device etc. of an image projection device of an embodiment.

In FIG. 1, a configuration example of a projection display device including an attaching device of this embodiment and an image projection device 10 attached to the attaching device is shown. FIG. 1 shows an example in which the attaching device (in a more limited sense, ceiling-hung fittings) of this embodiment is used as an attaching device of an image projection device 10 called a liquid crystal projector or a digital micromirror device. In addition, the attaching device and the image projection device 10 attached to the attaching device form a projection display device. Incidentally, in FIG. 1, intersecting axes (axes orthogonal to each other) are assumed to be an X axis, a Y axis, and a Z axis (in a broad sense, first, second, and third coordinate axes). Specifically, a plane parallel to a projection surface 22 (a screen) onto which the image projection device 10 projects an image is an X-Y plane defined by the X axis and the Y axis, and a direction intersecting (orthogonal to) the X-Y plane is a direction of the Z axis.

The image projection device 10 enlarges an image display light and projects the image display light from a projecting section 12 having an optical system such as a projection lens toward the projection surface 22 such as a screen or a wall. Specifically, the image projection device 10 generates a display light of a color image and emits the display light toward the projection surface 22 via the projecting section 12. As a result, the color image is displayed on the projection surface 22.

The attaching device (the ceiling-hung fittings) of this embodiment, shown in FIG. 1, has first, second, and third attaching sections 31, 32, and 33.

The first attaching section 31 (a first bracket, a first fixing member) is provided for attaching the attaching device to a ceiling 400 (a support, in a broad sense, an attachment object to which a device is to be attached), and is a member (fittings) for securing the attaching device to the ceiling 400, for example. The attaching section 31 is formed of, for example, fittings serving as a base, attaching fittings (screws, nuts) for securing the attaching device to the ceiling 400, and the like.

The second attaching section 32 (a second bracket, a second fixing member) is provided for attaching the image projection device 10 (in a broad sense, an image generating apparatus, electronic equipment) which projects an image onto the projection surface 22, and is, for example, a member (fittings) for securing the image projection device 10 to the attaching device. The attaching section 32 is formed of, for example, fittings serving as a base, attaching fittings for securing the image projection device 10 to the attaching device, and the like.

The third attaching section 33 (a third bracket, a third fixing member) is provided for attaching an optical detecting device 40, and is, for example, a member (fittings) for securing the optical detecting device 40 to the attaching device. The attaching section 33 is formed of, for example, fittings serving as a base, attaching fittings for securing the optical detecting device 40 to the attaching device, and the like.

Incidentally, the attaching sections 31, 32, and 33 may be integrally formed. For example, the base fittings of the attaching section 32 and the base fittings of the attaching section 33 may be integrated together into a single member, or may be coupled together by a joining section (a joint). Moreover, the optical detecting device 40 may be detachably attached to the attaching device, or may be secured to the attaching device in an undetachable way.

The optical detecting device 40 is a device for optically detecting an object OB in a detection region RDET. For example, as shown in FIG. 1, the detection region RDET is a region which is set along the projection surface 22 (a display region). Specifically, the detection region RDET is a region which is set along the X-Y plane on the Z direction's side (the user's side) of the projection surface 22 (the screen).

The optical detecting device 40 optically detects the object OB such as a finger of the user or a touch pen in the detection region RDET which is set on the front side (the Z direction's side) of the projection surface 22. To detect the object OB, the optical detecting device 40 includes an irradiating section, a light receiving section, and a detecting section, which are not shown in the drawing. The irradiating section emits an irradiation light for detecting the object OB toward the detection region RDET. For example, the irradiating section emits the irradiation lights with different intensities (intensities of illumination) in accordance with the position in the detection region RDET. The light receiving section receives the reflected light generated as a result of the irradiation light being reflected from the object OB such as the finger or the touch pen. The light receiving section RU is implemented, for example, in the form of a light receiving element such as a photodiode or a phototransistor. The detecting section detects the position information of the object OB based on the result of the light received by the light receiving section. The position information of the object OB is, for example, the X and Y coordinates or the Z coordinate of the object OB. Instead, the position information of the object OB may be a direction in which the object OB is located.

As described above, in this embodiment, the attaching section 33 for attaching the optical detecting device 40 is provided in the attaching device for attaching the image projection device 10 to the attachment object to which a device is to be attached, such as the ceiling 400. By doing so, it is possible to attach the optical detecting device 40 as an optional unit and thereby expand the range of user choices of options. Moreover, by attaching the optical detecting device 40, it is possible to provide an interactive user interface for the contents projected by the image projection device 10. For example, the user is allowed to indicate a displayed object in an image by using a finger or a touch pen while projecting the image of the presentation material on the projection surface 22 by the image projection device 10. This makes it possible to realize an unprecedented user interface.

Moreover, for example, as a first technique which is a comparative example of this embodiment, there may be a technique of incorporating the optical detecting device 40 into a housing (a case) of the image projection device 10 (the projector).

However, with this first technique, the housing of the image projection device 10 increases in size, resulting in an increase in the cost, for example. Moreover, it is difficult to handle both the user who requires the optical detecting device 40 and the user who does not require the optical detecting device 40.

On the other hand, according to this embodiment, as shown in FIG. 1, since the optical detecting device 40 is provided outside the image projection device 10, it is possible to prevent the above-mentioned problem of an increase in size of the housing of the image projection device 10. Moreover, it is possible to handle the user who requires the optical detecting device 40 by attaching the optical detecting device 40 to the attaching device, and it is possible to handle the user who does not require the optical detecting device 40 by removing the optical detecting device 40 from the attaching device or not attaching the optical detecting device 40 to the attaching device.

Furthermore, as a second technique which is a comparative example of this embodiment, there may be a technique of allowing the user to attach the optical detecting device 40 in an arbitrary location.

However, with this second technique, as will be described later, the detection accuracy cannot be ensured in some locations in which the optical detecting device 40 is placed. In addition, it is troublesome for the user to attach the optical detecting device 40 to the ceiling 400 or the like in an extra operation.

On the other hand, according to this embodiment, by using the attaching device as shown in FIG. 1, the positional relationship between the image projection device 10 and the optical detecting device 40 is fixed. Therefore, as will be described later, it is possible to place and fix the optical detecting device 40 in a region in which a heat dissipation section of the image projection device 10 is not placed or provide an incident light regulating section regulating the incident light which reduces the detection accuracy. This makes it easy to ensure the detection accuracy etc. of the optical detecting device 40. In addition, when the image projection device 10 is attached to the ceiling 400 by the attaching device, it is possible to attach the optical detecting device 40 together with the image projection device 10. This makes it possible to prevent an addition of a troublesome operation which is performed by the user and provide the user with improved convenience.

2. Displacement of Detected Position Due to Heat Dissipation

Figure 2:
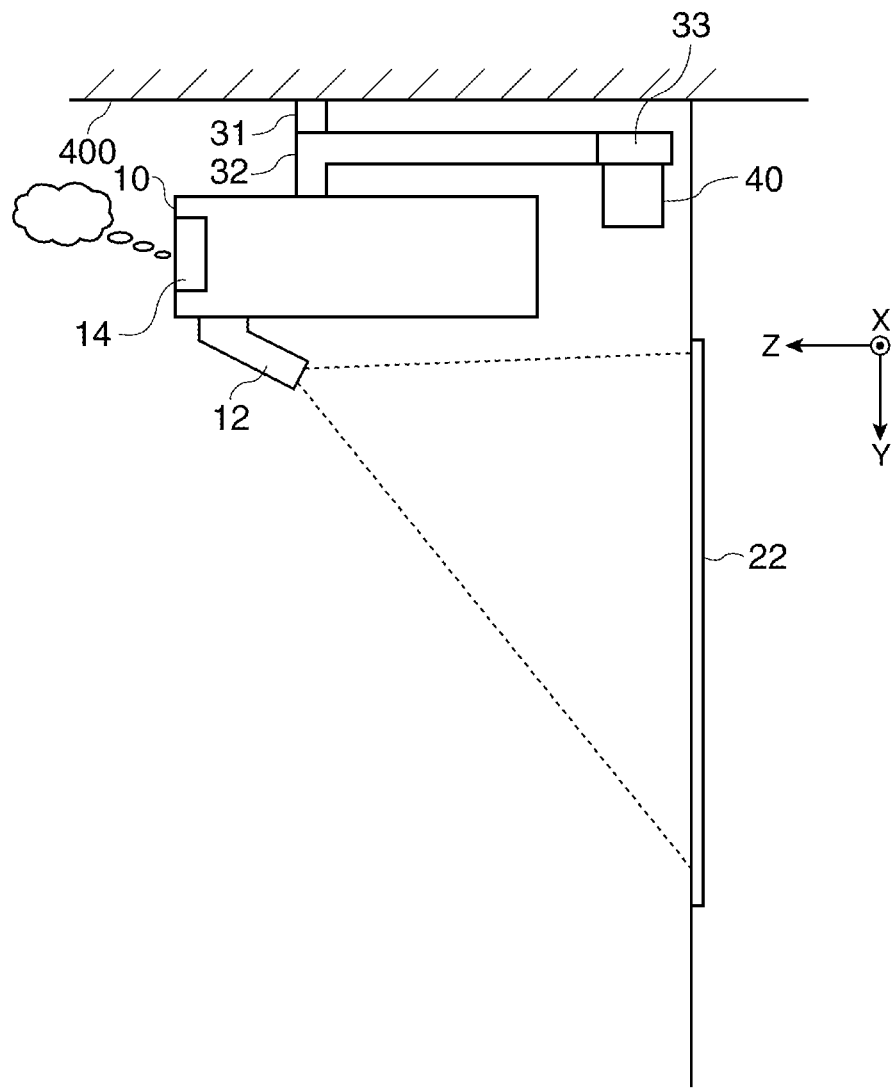
FIG. 2 is an explanatory diagram of a technique of providing an optical detecting device in a region in which a heat dissipation section of the image projection device is not placed.

As shown in FIG. 2, the image projection device 10 is provided with a heat dissipation section 14 for dissipating heat built up in the housing. Specifically, a fan and an exhaust port for exhausting the air inside the housing are provided as the heat dissipation section 14.

However, if the optical detecting device 40 is placed in a location which is exposed to the heated air from the heat dissipation section 14 such as a fan, there is a possibility that displacement of the detected position of the object OB is caused due to, for example, the temperature dependence of the characteristics of an element (a light receiving element, a light emitting element, a transistor, and the like) of the optical detecting device 40. For example, as in the above-described second technique, in the technique in which the user places the optical detecting device 40 in an arbitrary location, the displacement of the detected position varies depending on the position in which the optical detecting device 40 is placed, and it is difficult to make an adjustment thereto. Moreover, since the state of dissipation of heat from the heat dissipation section 14 of the image projection device 10 changes with time, the displacement of the detected position varies, for example, in a period in which heat is often dissipated and a period in which heat is not dissipated frequently.

Therefore, in the attaching device of this embodiment, as shown in FIG. 2, when the image projection device 10 has the heat dissipation section 14 for dissipating heat to the outside, the optical detecting device 40 is attached, by the attaching section 33, in a region in which the heat dissipation section 14 is not placed. For example, the attaching section 33 is provided in a region in which the heat dissipation section 14 is not placed, and the optical detecting device 40 is attached by this attaching section 33.

Specifically, in FIG. 2, the heat dissipation section 14 is provided in a back side of the image projection device 10 (a side thereof opposite to the projection surface 22). As a result, the optical detecting device 40 is attached to a front side of the image projection device 10 (a side thereof facing the projection surface 22) by the attaching section 33 of the attaching device. That is, the attaching section 33 is provided in a location in which the optical detecting device 40 is less exposed to the heated air from the fan which is the heat dissipation section 14.

As described above, by attaching the optical detecting device 40 in a region in which the heat dissipation section 14 is not placed (a region which is not exposed to the heat from the heat dissipation section) by the attaching section 33, it is possible to solve the problem of displacement of the detected position caused by the heat from the heat dissipation section 14.

In particular, this embodiment focuses on the positional relationship between the image projection device and the optical detecting device 40, the positional relationship which is fixed via the attaching device. The use of such a fixed positional relationship makes it possible to place the optical detecting device 40 in a region in which the optical detecting device 40 is not exposed to the heat from the heat dissipation section 14 and prevent the problem of displacement of position detection effectively.

Incidentally, in this embodiment, the optical detecting device 40 (the attaching section 33) is placed in a region in which the heat dissipation section 14 is not placed. Some examples of a region in which the heat dissipation section 14 is not placed are shown in FIGS. 3A to 3C.

Figure 3A:
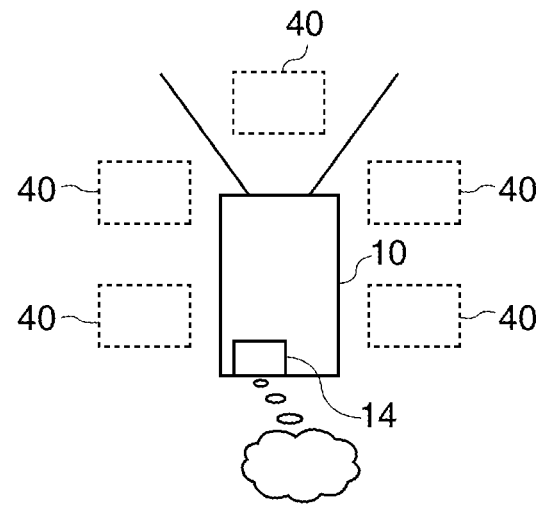
FIGS. 3A to 3C are explanatory diagrams of a technique of providing the optical detecting device in a region in which the heat dissipation section of the image projection device is not placed.

For example, in FIG. 3A, the heat dissipation section 14 is provided behind the image projection device 10 (the housing). In this case, the optical detecting device 40 is attached in a position in which the optical detecting device 40 faces the left side, the right side, or the front face, for example, of the image projection device 10.

Figure 3B:
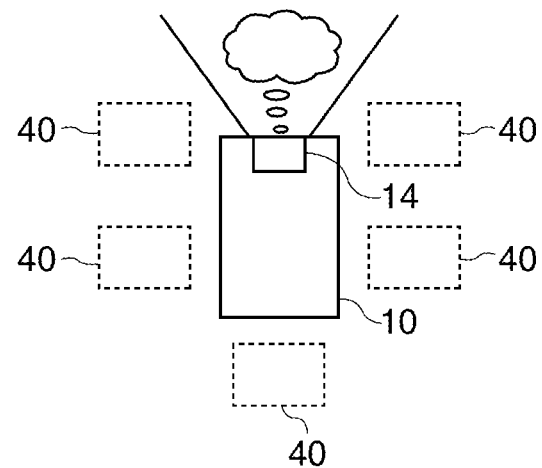

Moreover, in FIG. 3B, the heat dissipation section 14 is provided on the front face of the image projection device 10. In this case, the optical detecting device 40 is attached to a position in which the optical detecting device 40 faces the left side, the right side, or the back face of the image projection device 10.

Figure 3C:
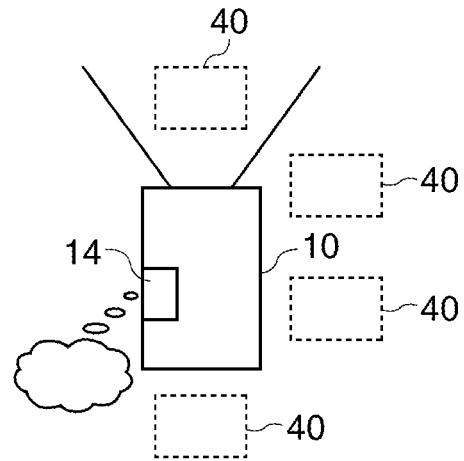

Furthermore, in FIG. 3C, the heat dissipation section 14 is provided on the left side of the image projection device 10. In this case, the optical detecting device 40 is attached to a position in which the optical detecting device 40 faces the right side, the front face, or the back face of the image projection device 10.

As described above, in this embodiment, when the heat dissipation section 14 is provided on any one of the front face, the back face, the left side, and the right side of the image projection device 10, the optical detecting device 40 is attached to a position in which the optical detecting device 40 faces a face or side other than the above one face or side. By doing so, attachment of the optical detecting device 40 in a region in which the heat dissipation section 14 is not placed is realized.

3. Displacement of Detected Position Due to Reflected Light

Figure 4A:
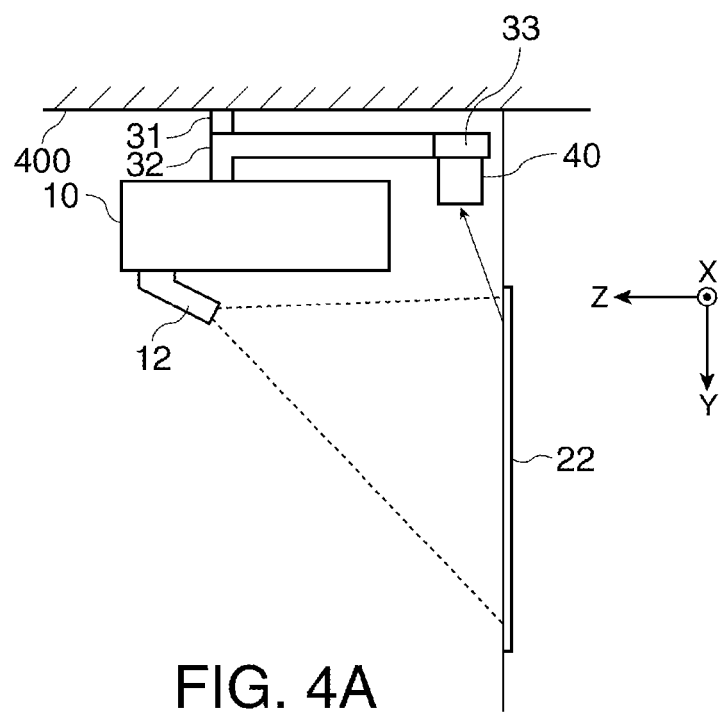
FIGS. 4A and 4B are explanatory diagrams explaining a problem of displacement of a detected position caused by a reflected light.

In FIG. 4A, a short focus image projection device 10, for example, is attached to the ceiling 400 by the attaching device. The projection light projected from the image projection device 10 is reflected from the projection surface 22 such as a screen, and infrared light contained in the reflected light enters the optical detecting device 40. As described above, when the light other than the reflected light from the object such as a finger of the user or a touch pen enters the light receiving element of the optical detecting device 40, displacement of the detected position may occur. In particular, as shown in FIG. 1, since the detection region RDET of the optical detecting device 40 is set in a front region just near the projection surface 22, there is a high possibility that the light reflected from the projection surface 22 enters the optical detecting device 40.

Figure 4B:
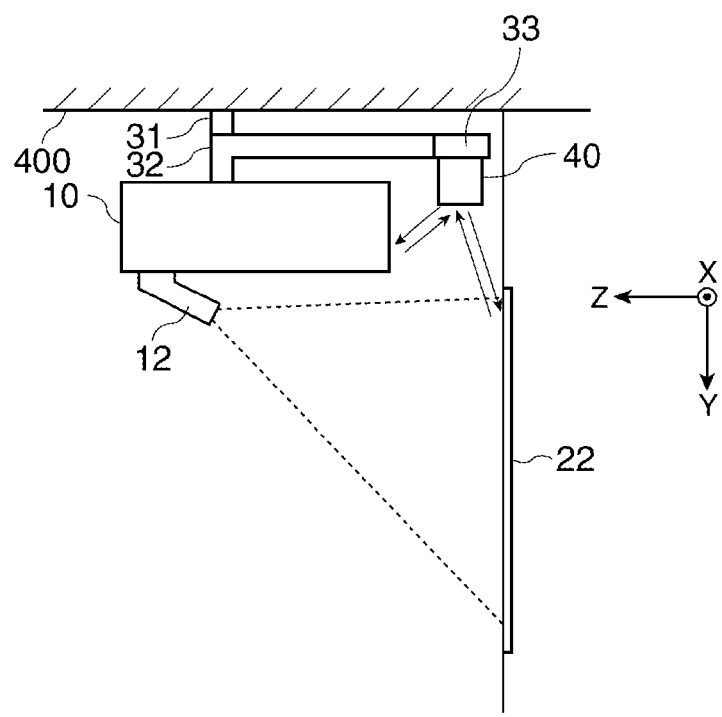

Moreover, in FIG. 4B, the optical detecting device 40 is attached between the image projection device 10 and the wall on which the projection surface 22 is located. The irradiation light emitted from the optical detecting device 40 is reflected by the housing of the image projection device 10, and the reflected light enters the optical detecting device 40. Moreover, the irradiation light from the optical detecting device 40 is reflected from the projection surface (the wall), and the reflected light enters the optical detecting device 40. Also in this case, there is a possibility that the level of the default light entering the light receiving element of the optical detecting device 40 changes and displacement of the detected position occurs.

Figure 5:
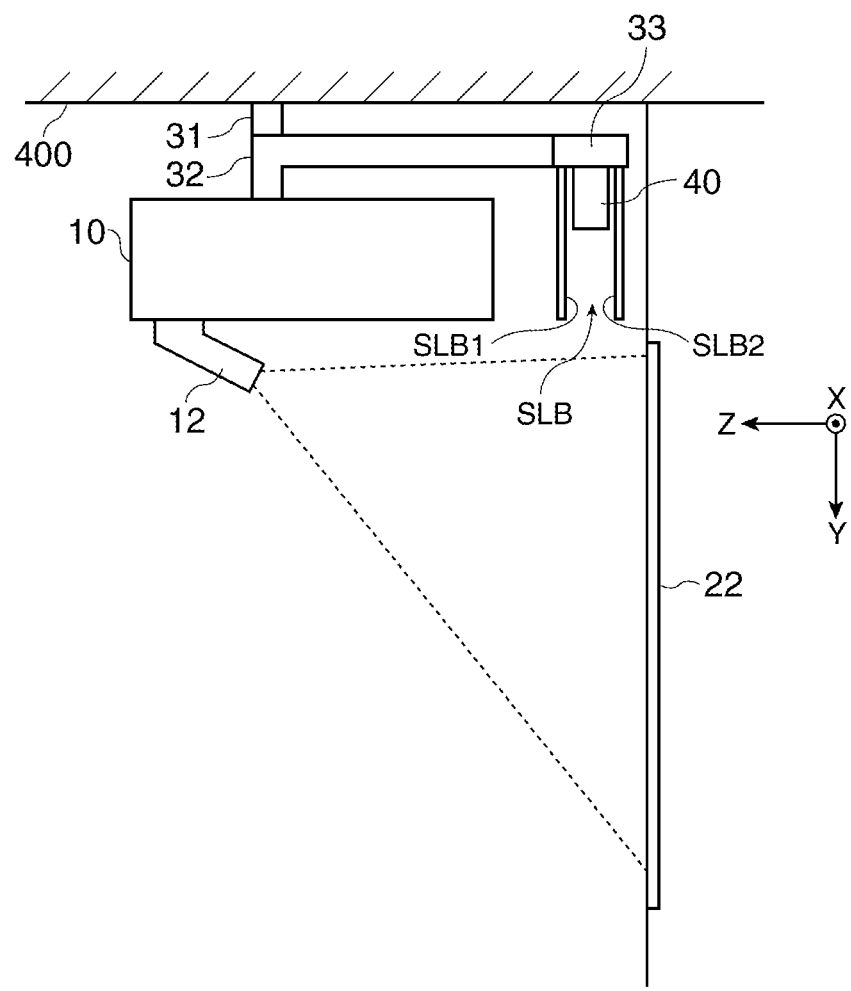
FIG. 5 is an explanatory diagram of a technique of providing an incident light regulating section.

It is for this reason that, in this embodiment, an incident light regulating section which regulates the entrance of the light in the incident direction intersecting the plane of the detection region RDET (the X-Y plane) into the optical detecting device 40 is provided. Specifically, as shown in FIG. 5, an incident light slit SLB having a slit surface in a direction (a direction parallel to the projection surface) along the plane of the detection region RDET (the X-Y plane) is provided. For example, the incident light slit SLB of FIG. 5 has a first slit surface SLB1 and a second slit surface SLB2 which are provided so as to sandwich the optical detecting device 40.

Such an incident light regulating section implemented in the form of the incident light slit SLB or the like regulates (restricts) the entrance of a reflected light into the optical detecting device 40, the reflected light generated as a result of the projection light from the image projection device 10 being reflected from the projection surface 22 as shown in FIG. 4A, or regulates (restricts) the entrance of a reflected light into the optical detecting device 40, the reflected light generated as a result of the irradiation light from the optical detecting device 40 being reflected from the projection surface 22 or the image projection device 10 as shown in FIG. 4B. That is, the incident light regulating section is formed of a member which is shaped and placed so as to regulate the entrance of the reflected lights shown in FIGS. 4A and 4B into the optical detecting device 40.

By providing such an incident light regulating section such as the incident light slit SLB or the like, it is possible to prevent displacement of the detected position caused by the entrance of the reflected lights as shown in FIGS. 4A and 4B and ensure the detection accuracy of the optical detecting device 40.

In particular, since the image projection device 10 and the optical detecting device 40 are attached as an integrated member by the attaching device of this embodiment, the positional relationship between these devices is fixed. Therefore, such a fixed positional relationship makes it possible to set easily the shape and the placement of the incident light regulating section which prevents the reflected light from the image projection device 10 or the like from entering the optical detecting device 40. That is, as described earlier, in the technique of the comparative example in which the user sets the optical detecting device 40 in an arbitrary location, it is necessary to provide an incident light regulating section in such a way as to deal with cases in which the optical detecting device 40 is set in various locations. This makes it difficult to set the shape and the placement of the incident light regulating section. On the other hand, with the attaching device of this embodiment, since the positional relationship between the image projection device 10 and the optical detecting device 40 is fixed, it is possible to deal with cases in which the optical detecting device 40 is set in various locations just by providing the incident light slit SLB which is shaped and placed as shown in FIG. 5, for example.

Figure 6A:
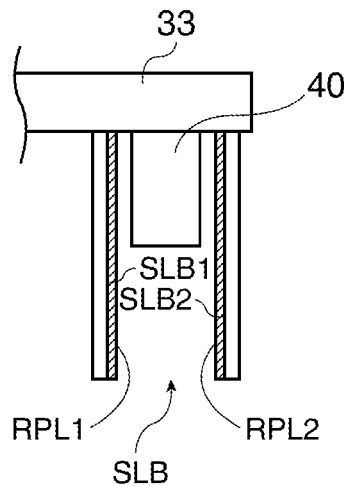
FIGS. 6A to 6C show specific examples of the incident light regulating section and an irradiation direction regulating section.

Furthermore, in this embodiment, as shown in FIG. 6A, it is preferable to provide antireflective layers (antireflective films) RPL1 and RPL2 on the slit surfaces SLB1 and SLB2. For example, the antireflective layers RPL1 and RPL2 are formed by applying nonreflective coating to the slit surfaces SLB1 and SLB2. By doing so, it is possible to regulate the entrance of the light reflected from the slit surfaces SLB1 and SLB2 into the light receiving element of the optical detecting device 40 and prevent a reduction in the detection accuracy etc. of the optical detecting device 40.

Figure 6B:
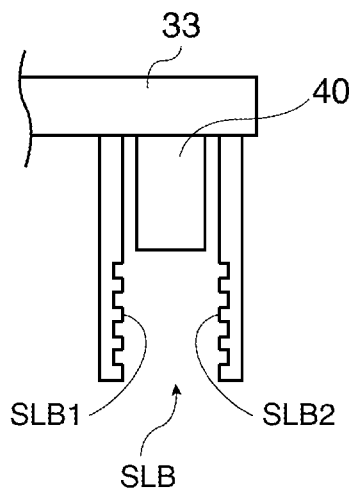

Incidentally, in place of the antireflective layers RPL1 and RPL2, a depressed section may be provided on the slit surfaces SLB1 and SLB2 as shown in FIG. 6B. That is, in FIG. 5, the slit surfaces SLB1 and SLB2 are flat; in FIG. 6B, the slit surfaces SLB1 and SLB2 are not flat, but depressed. By providing such a depressed section, it is possible to prevent surface reflection on the slit surfaces SLB1 and SLB2. This makes it possible to regulate the entrance of unnecessary reflected light into the light receiving element of the optical detecting device 40 and prevent a reduction in the detection accuracy etc. of the optical detecting device 40.

Moreover, in FIG. 6C, as will be described later, the optical detecting device 40 has an irradiation light slit SL (an irradiation direction regulating section). The irradiation light slit SL regulates the irradiation light for object detection, the irradiation light emitted from the optical detecting device 40, such that the irradiation light travels in a direction (a direction parallel to the projection surface) along the plane of the detection region RDET (the X-Y plane) of FIG. 1, and has first and second slit surfaces SFL1 and SFL2. By providing such an irradiation light slit SL, it is possible to regulate the irradiation direction of the irradiation light emitted from the optical detecting device 40 such that the irradiation light travels in a direction along the plane of the detection region RDET. Therefore, it is possible to prevent the irradiation light toward the detection region RDET from spreading in the Z direction of FIG. 1 and prevent the body of the user from being erroneously detected as an object such as a finger or a touch pen when the body of the user approaches the screen 20.

Figure 6C:
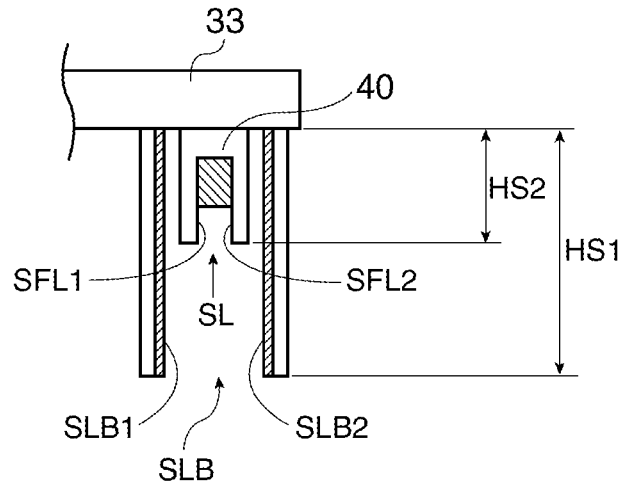

In FIG. 6C, assume that the height from the attaching section 33 to the end of the incident light slit SLB is HS1 and the height from the attaching section 33 to the end of the irradiation light slit SL is HS2. Then, in FIG. 6C, HS1>HS2 holds. That is, the incident light slit SLB is higher than the irradiation light slit SL.

By doing so, the direction of the irradiation light from the optical detecting device 40 is regulated by the irradiation light slit SL such that the irradiation light travels in a direction along the plane of the detection region RDET. Moreover, due to the presence of the incident light slit SLB, the irradiation light whose irradiation direction is displaced in the Z direction is also regulated such that the irradiation light does not travel toward the image projection device 10 or the projection surface 22 as shown in FIG. 4B, and it is possible to regulate the entrance of the reflected light reflected from the image projection device 10 or the projection surface 22 into the optical detecting device 40. Therefore, it is possible to prevent a reduction in the detection accuracy etc. caused by the entrance of the reflected light.

Incidentally, the descriptions heretofore mainly deal with a case in which the optical detecting device 40 is attached between the image projection device 10 and the projection surface 22 by the attaching device of this embodiment. However, this embodiment is not limited thereto. For example, as shown in a modified example of FIG. 7, the optical detecting device 40 may be attached by providing the attaching section 33 on a back side of the image projection device 10 (a side thereof opposite to the projection surface). For example, it is preferable to provide the optical detecting device 40 in a position shown in FIG. 7 in the short focus image projection device 10 which can project a large image on the projection surface 22 even if the distance to the projection surface 22 is a short distance such as a distance of 8 to 20 cm.

Figure 7:
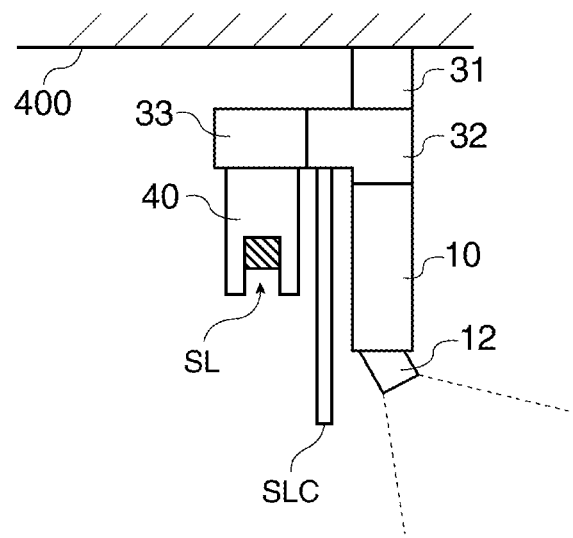
FIG. 7 shows a modified example of the attaching device of this embodiment.

In addition, in this case, it is necessary simply to provide a plate-like incident light regulating section SLC shown in FIG. 7, for example, between the image projection device 10 and the optical detecting device 40. By providing such an incident light regulating section SLC, it is possible to prevent the projection light from the image projection device 10 from being reflected from the projection surface 22 or the like and entering the optical detecting device 40. It is also possible to prevent an increase in the level of the default light as a result of the irradiation light from the optical detecting device 40 being reflected from the image projection device 10 or the projection surface 22 and entering the optical detecting device 40. This makes it possible to maintain the accuracy of position detection of the optical detecting device 40.

4. Configuration of Optical Detecting Device

Next, a configuration example of the optical detecting device will be described. The optical detecting device of FIG. 8 includes an irradiating section EU, a light receiving section RU, and a detecting section 50. Moreover, the optical detecting device can include a control section 60.

The irradiating section EU emits an irradiation light (a detection light) for detecting an object. Specifically, the irradiating section EU radially emits irradiation lights with different intensities (intensities of illumination) in accordance with the irradiation direction. As a result, in the detection region RDET (see FIG. 1), an irradiation light intensity distribution in which the intensity of the irradiation light differs in accordance with the irradiation direction is formed.

The light receiving section RU receives a reflected light generated as a result of the irradiation light from the irradiating section EU being reflected from the object. The light receiving section RU can be implemented in the form of a light receiving element such as a photodiode or a phototransistor. The detecting section 50 is, for example, electrically connected to the light receiving section RU.

The detecting section 50 detects at least the direction etc. in which the object is located based on the result of the light received by the light receiving section RU. The function of the detecting section can be realized by an integrated circuit device having an analog circuit and the like, software (a program product) operating on a microcomputer, and the like. For example, the detecting section converts the detection current generated as a result of the light receiving element of the light receiving section having received the reflected light from the object into a detection voltage, and detects the position, the direction, etc. in which the object is located based on the detection voltage which is the result of the received light.

Specifically, the detecting section 50 detects the distance to the object (the distance from the position in which the irradiating section is placed) based on the result of the light received by the light receiving section RU (the received-light signal). The detecting section 50 detects the position of the object based on the detected distance and the detected direction in which the object is located (the direction in which the object is present). For example, the detecting section 50 detects the X and Y coordinates in the X-Y plane of the detection region RDET. Incidentally, first and second irradiating sections which are a given distance away from each other along the X-axis direction may be provided. In this case, the detecting section 50 detects the direction in which the object is located with respect to the first irradiating section as a first direction based on the result of the received light, i.e., a first reflected light generated as a result of a first irradiation light from the first irradiating section being reflected from the object. Moreover, the detecting section 50 detects the direction in which the object is located with respect to the second irradiating section as a second direction based on the result of the received light, i.e., a second reflected light generated as a result of a second irradiation light from the second irradiating section being reflected from the object. The detecting section 50 only has to detect the position of the object based on the detected first and second directions and the distance between the first and second irradiating sections.

The control section 60 performs various types of control processing of the optical detecting device. Specifically, the control section 60 performs light emitting control of a light source section of the irradiating section EU. The control section 60 is electrically connected to the irradiating section EU and the detecting section 50. The function of the control section 60 can be realized by an integrated circuit device, software operating on the microcomputer, and the like. For example, when the irradiating section EU includes first and second light source sections, the control section 60 performs control so as to make the first and second light source sections emit light alternately. Moreover, as described above, when the first and second irradiating sections are provided, in a first period in which the direction in which the object is located with respect to the first irradiating section is obtained, the control section 60 performs control so as to make first and second light source sections provided in the first irradiating section emit light alternately. In addition, in a second period in which the direction in which the object is located with respect to the second irradiating section is obtained, the control section 60 performs control so as to make third and fourth light source sections provided in the second irradiating section emit light alternately.

5. Object Detection Technique

Next, an object detection technique according to this embodiment will be described in detail.

Figure 9A:
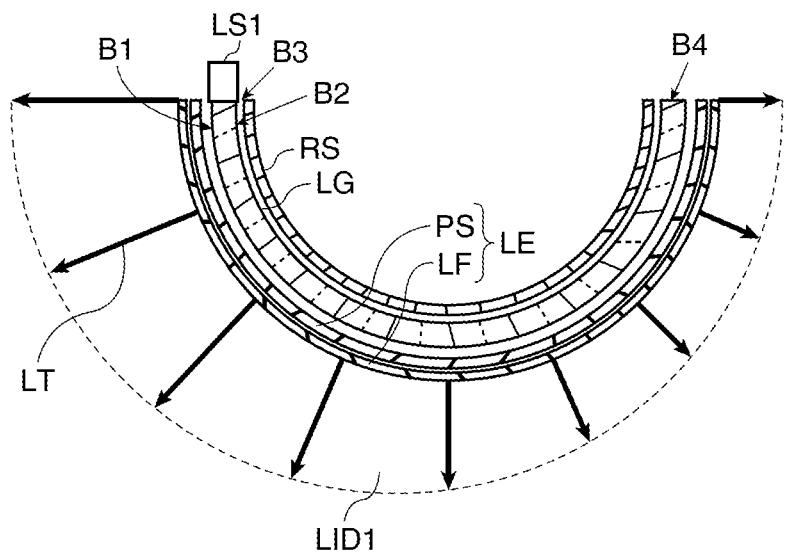
FIGS. 9A and 9B are explanatory diagrams of the detection technique using the optical detecting device.

As shown in FIG. 9A, the optical detecting device (the irradiating section) of this embodiment includes a light source section LS1, a light guide LG, and an irradiation direction setting section LE. Moreover, the optical detecting device includes a reflecting sheet RS. In addition, the irradiation direction setting section LE includes an optical sheet PS and a louver film LF. It is to be understood that various modifications are possible by omitting part of these component elements or adding another component element.

The light source section LS1 emits a source light, and has a light emitting element such as an LED (light-emitting diode). The light source section LS1 emits a source light of infrared light (near infrared radiation close to a visible radiation region), for example. That is, it is preferable that the source light emitted from the light source section LS1 be a light in a wavelength band which is efficiently reflected from an object such as a finger of the user or a touch pen, or a light in a wavelength band which is seldom contained in environmental light, i.e., ambient light. Specifically, the source light emitted from the light source section LS1 is infrared light of a wavelength near 850 nm, which is a light in a wavelength band with a high degree of reflection on the surface of a human body, or infrared light near 950 nm, which is a light in a wavelength band which is seldom contained in environmental light.

The light guide LG (a light guiding member) guides the source light emitted from the light source section LS1. For example, the light guide LG guides the source light from the light source section LS1 along a curved light guiding path, and has a curved shape. Specifically, in FIG. 9A, the light guide LG is shaped like an arc. Incidentally, in FIG. 9A, the light guide LG has an arc shape with a central angle of 180 degrees; however, the light guide LG may have an arc shape with a central angle of less than 180 degrees. The light guide LG is formed of a transparent resin member such as acrylic resin or polycarbonate, or the like. The source light from the light source section LS1 enters a light entrance face at one end (in FIG. 9A, a left-side end) of the light guide LG.

At least one of an outer circumferential side (a side identified by B1) and an inner circumferential side (a side identified by B2) of the light guide LG is processed for adjusting the light exit efficiency of the source light from the light guide LG. As a processing technique, various techniques such as silk printing processing by which reflecting dots are printed, a molding method for forming projections and depressions by a stamper or injection, and a grooving method can be adopted.

The irradiation direction setting section LE (the irradiation light exit section) implemented by using the prism sheet PS and the louver film LF is provided on the outer circumferential side of the light guide LG, and receives the source light exiting from the outer circumferential side (the outer circumferential surface) of the light guide LG. Then, the irradiation direction setting section LE makes an irradiation light LT exit, the irradiation light LT whose irradiation direction is set so that the irradiation light LT travels from the inner circumferential side (B2) to the outer circumferential side (B1) of the curved (arc-shaped) light guide LG. That is, the irradiation direction setting section LE sets (regulates) the direction in which the source light travels, the source light exiting from the outer circumferential side of the light guide LG, at an irradiation direction along the normal direction (the radial direction), for example, of the light guide LG. As a result, the irradiation light LT is made to exit radially from the inner circumferential side to the outer circumferential side of the light guide LG.

The above settings of the irradiation direction of the irradiation light LT are realized by using the prism sheet PS and the louver film LF of the irradiation direction setting section LE. For example, the prism sheet PS makes settings so that the peak of the light exit characteristics coincides with the normal direction by, for example, making the direction in which the source light travels, the source light exiting from the outer circumferential side at a low viewing angle, closer to the normal direction. Moreover, the louver film LF blocks (filters out) the light (the light with a low viewing angle) travelling in a direction other than the normal direction. Incidentally, a diffusing sheet or the like may be provided in the irradiation direction setting section LE. Furthermore, the reflecting sheet RS is provided on the inner circumferential side of the light guide LG. By providing the reflecting sheet RS on the inner circumferential side as described above, it is possible to improve the light exit efficiency of the source light traveling to the outer circumferential side.

As shown in FIG. 9A, as a result of the light source section LS1 emitting a source light toward the light entrance face at one end (B3) of the light guide LG, a first irradiation light intensity distribution LID1 is formed in an object detection region. The first irradiation light intensity distribution LID1 is an intensity distribution in which the intensity of the irradiation light is the highest at the one end (B3) of the light guide LG, decreases with increasing distance from the one end (B3), and is the lowest at the other end (B4) of the light guide LG. That is, in FIG. 9A, the magnitude of a vector of the irradiation light LT represents the intensity (the intensity of illumination), and the intensity of the irradiation light LT is the highest at the one end (B3) of the light guide LG; the intensity is the lowest at the other end (B4) thereof. In addition, the intensity of the irradiation light LT decreases monotonously with increasing distance from the one end to the other end of the light guide LG.

Figure 9B:
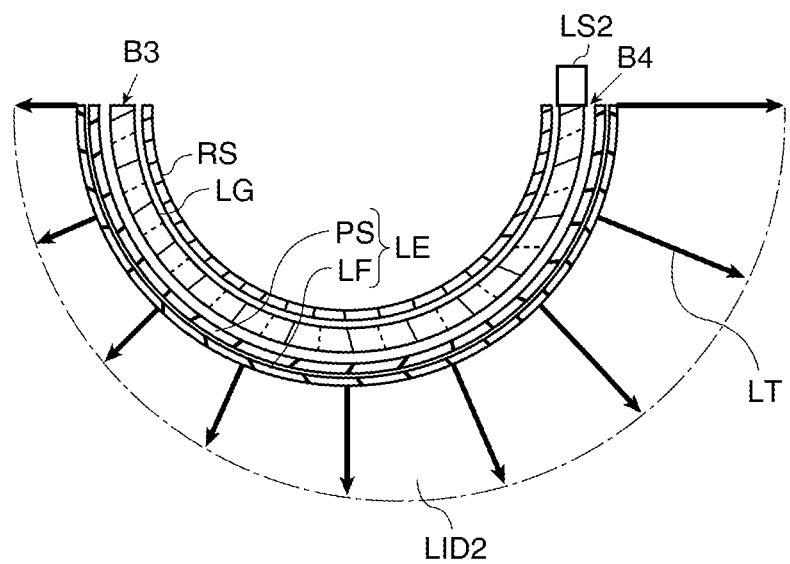

On the other hand, as shown in FIG. 9B, as a result of a second light source section LS2 emitting a second source light toward the light entrance face of the other end (B4) of the light guide LG, a second irradiation light intensity distribution LID2 is formed in the detection region. The second irradiation light intensity distribution LID2 has an intensity distribution which is different from that of the first irradiation light intensity distribution LID1, and is an intensity distribution in which the intensity of the irradiation light decreases with increasing distance from the other end (B4) to the one end (B3) of the light guide LG. That is, in FIG. 9B, the intensity of the irradiation light LT is the highest at the other end of the light guide LG, and the intensity is the lowest at the one end thereof. In addition, the intensity of the irradiation light LT decreases monotonously with increasing distance from the other end to the one end.

By forming the irradiation light intensity distributions LID1 and LID2 described above and receiving the reflected lights from the object, the reflected lights generated as a result of the irradiation lights having these intensity distributions being reflected from the object, it is possible to detect the object with a higher degree of accuracy while minimizing the influence of the ambient light such as the environmental light. That is, it is possible to cancel out an infrared component contained in the ambient light and minimize a negative influence of the infrared component on the detection of the object.

Figure 10A:
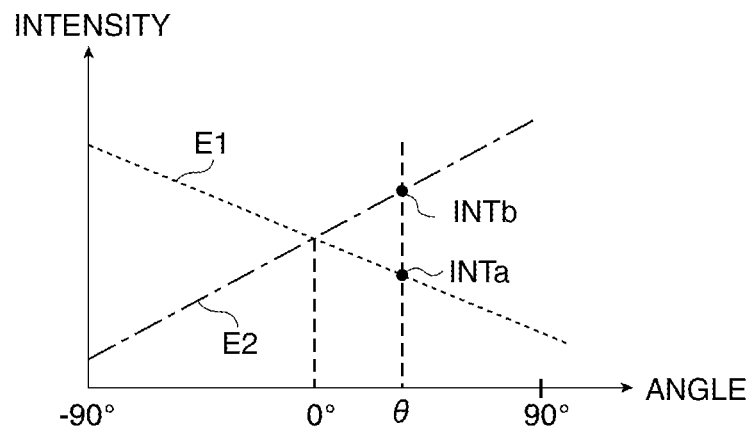
FIGS. 10A and 10B are explanatory diagrams of the detection technique using the optical detecting device.

For example, E1 of FIG. 10A shows a relationship between the angle of the irradiation direction of the irradiation light LT and the intensity of the irradiation light LT at that angle in the irradiation light intensity distribution LID1 of FIG. 9A. In E1 of FIG. 10A, the intensity is the highest when the irradiation direction is a direction DD1 (a left-hand direction) of FIG. 10B. On the other hand, the intensity is the lowest when the irradiation direction is a direction DD3 (a right-hand direction), and, in a direction DD2, the intensity is an intensity intermediate between the highest intensity and the lowest intensity. Specifically, with respect to an angle change from the direction DD1 to the direction DD3, the intensity of the irradiation light decreases monotonously, for example, changes linearly. Incidentally, in FIG. 10B, the center position of the arc formed by the light guide LG coincides with a placement position PE in which the optical detecting device is placed.

Moreover, E2 of FIG. 10A shows a relationship between the angle of the irradiation direction of the irradiation light LT and the intensity of the irradiation light LT at that angle in the irradiation light intensity distribution LID2 of FIG. 9B. In E2 of FIG. 10A, the intensity is the highest when the irradiation direction is the direction DD3 of FIG. 10B. On the other hand, the intensity is the lowest when the irradiation direction is the direction DD1, and, in the direction DD2, the intensity is an intensity intermediate between the highest intensity and the lowest intensity. Specifically, with respect to an angle change from the direction DD3 to the direction DD1, the intensity of the irradiation light decreases monotonously, for example, changes linearly. Incidentally, in FIG. 10A, there is a linear relationship between the angle of the irradiation direction and the intensity; however, this embodiment is not limited thereto. For example, there may be a hyperbolic relationship between the angle of the irradiation direction and the intensity.

Figure 10B:
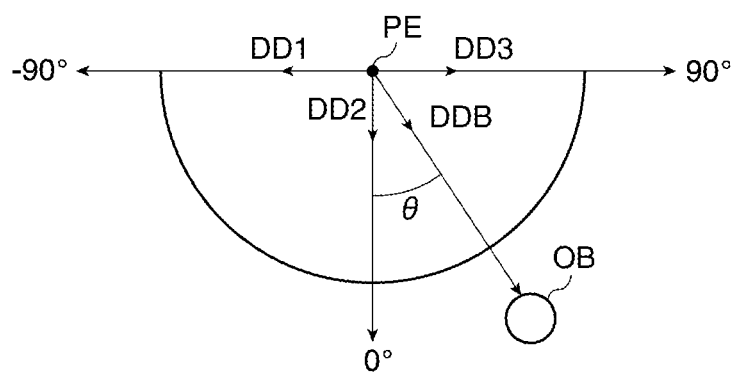

As shown in FIG. 10B, assume that an object OB is present in a direction DDB with an angle θ. Then, when the irradiation light intensity distribution LID1 is formed as a result of the light source section LS1 emitting light as shown in FIG. 9A (in the case of E1), the intensity in the position of the object OB which is present in the direction DDB (with an angle θ) is INTa as shown in FIG. 10A. On the other hand, when the irradiation light intensity distribution LID2 is formed as a result of the light source section LS2 emitting light as shown in FIG. 9B (in the case of E2), the intensity in the position of the object OB which is present in the direction DDB is INTb.

Figure 12A:
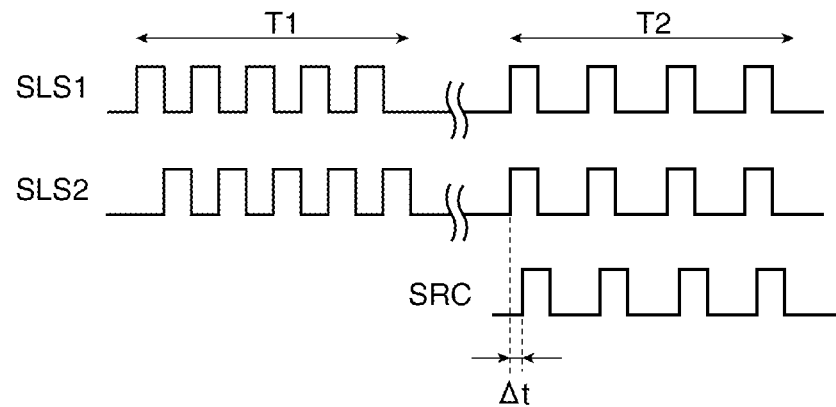
FIGS. 12A and 12B are examples of a signal waveform for explaining the detection technique using the optical detecting device.
Figure 12B:
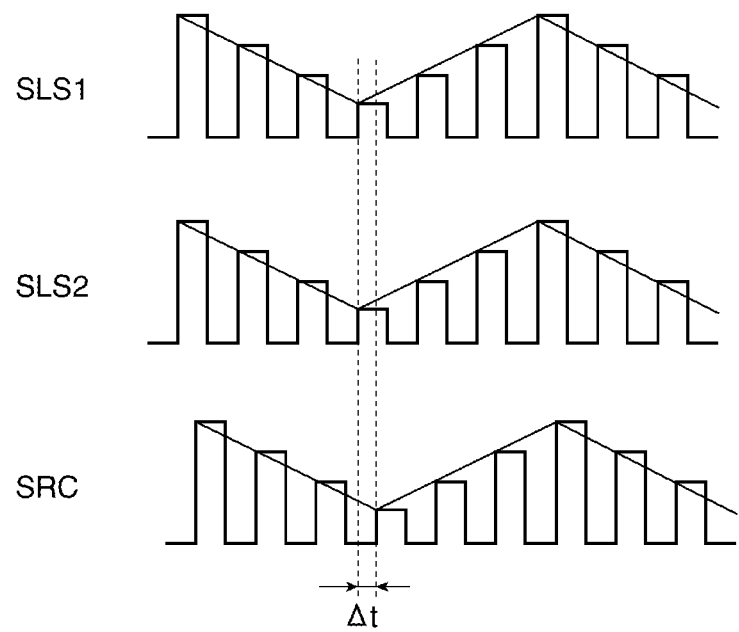
Figure 13:
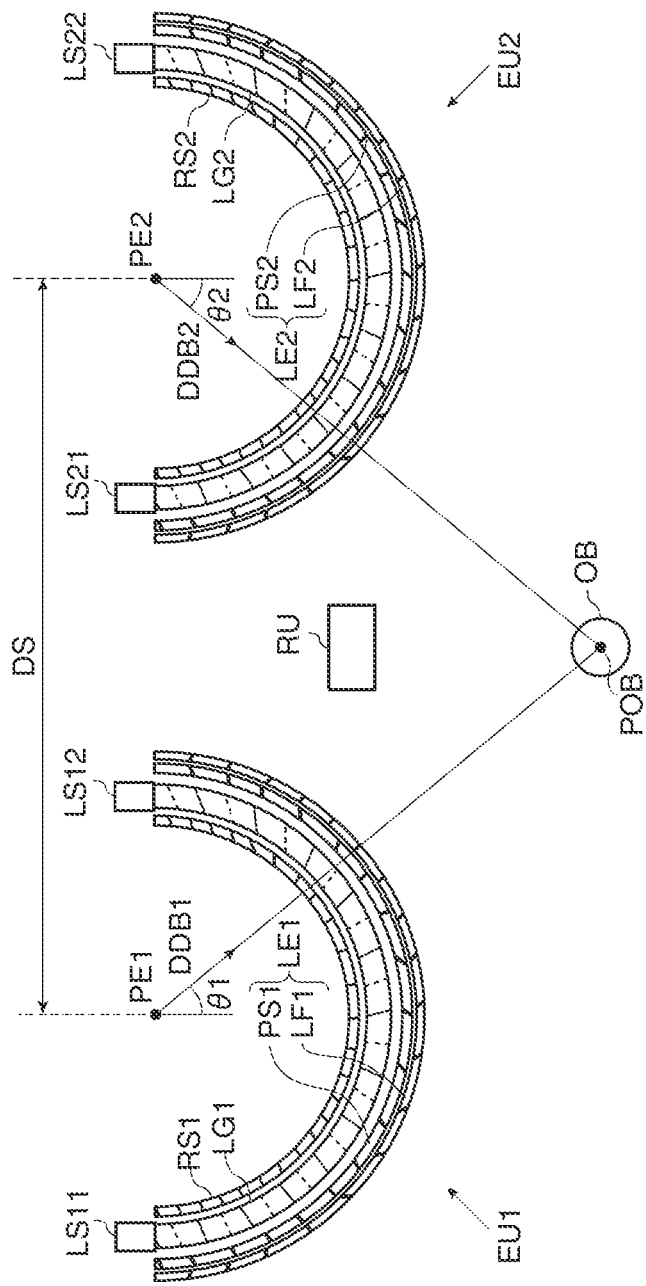
FIG. 13 shows a modified example of the optical detecting device.

Therefore, by obtaining the relationship between the intensities INTa and INTb, it is possible to determine the direction DDB (angle θ) in which the object OB is located. Then, by obtaining the distance to the object OB based on the placement position PE in which the optical detecting device is placed by using a technique shown in FIGS. 12A and 12B, for example, which will be described later, it is possible to determine the position of the object OB based on the obtained distance and the direction DDB. Alternatively, by providing two irradiating sections EU1 and EU2 as shown in FIG. 13 which will be described later, and obtaining directions DDB1 (θ1) and DDB2 (θ2) of the object OB with respect to the irradiating sections EU1 and EU2, respectively, it is possible to determine the position of the object OB based on the directions DDB1 and DDB2 and the distance DS between the irradiating sections EU1 and EU2.

Figure 8:
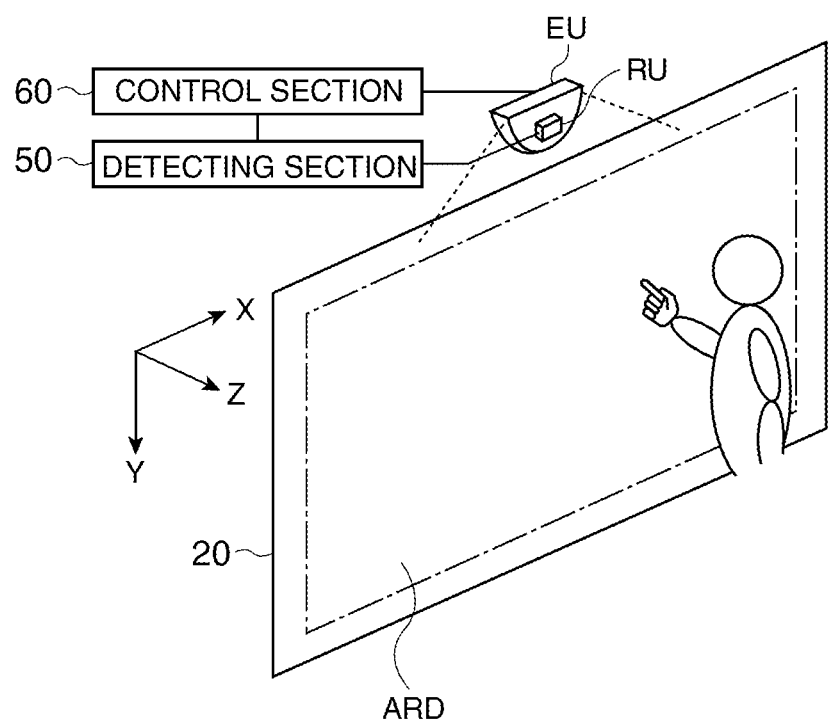
FIG. 8 is an explanatory diagram of a detection technique using an optical detecting device.

In order to obtain the relationship between the intensities INTa and INTb, in this embodiment, the light receiving section RU of FIG. 8 receives a reflected light (a first reflected light) reflected from the object OB when the irradiation light intensity distribution LID1 shown in FIG. 9A is formed. When the detected amount of received reflected light at this time is assumed to be Ga, Ga corresponds to the intensity INTa. Moreover, the light receiving section RU receives a reflected light (a second reflected light) reflected from the object OB when the irradiation light intensity distribution LID2 shown in FIG. 9B is formed. When the detected amount of received reflected light at this time is assumed to be Gb, Gb corresponds to the intensity INTb. Therefore, when the relationship between the detected amounts of received lights Ga and Gb is obtained, the relationship between the intensities INTa and INTb is obtained, whereby it is possible to obtain the direction DDB in which the object OB is located.

For example, let a controlled variable (for example, the amount of current), a conversion factor, and the amount of emitted light of the light source section LS1 of FIG. 9A be Ia, k, and Ea, respectively, and a controlled variable (the amount of current), a conversion factor, and the amount of emitted light of the light source section LS2 of FIG. 9B be Ib, k, and Eb, respectively. Then, equations (1) and (2) below hold.

$$Ea = k \cdot Ia \quad (1)$$

$$Eb = k \cdot Ib \quad (2)$$

Moreover, let an attenuation coefficient of a source light (a first source light) from the light source section LS1 be fa, the detected amount of received reflected light (a first reflected light) corresponding to the source light be Ga, an attenuation coefficient of a source light (a second source light) from the light source section LS2 be fb, and the detected amount of received reflected light (a second reflected light) corresponding to the source light be Gb. Then, equations (3) and (4) below hold.

$$Ga=fa \cdot Ea=fa \cdot k \cdot Ia \quad (3)$$

$$Gb=fb \cdot Eb=fb \cdot k \cdot Ib \quad (4)$$

Therefore, the ratio between the detected amounts of received lights Ga and Gb is given by equation (5) below.

$$Ga/Gb=(fa/fb) \cdot (Ia/Ib) \quad (5)$$

Here, it is possible to determine Ga/Gb based on the result of the light received by the light receiving section RU and determine Ia/Ib based on the controlled variable of the irradiating section EU by the control section 60. In addition, there is a unique relationship between the intensities INTa and INTb of FIG. 10A and the attenuation coefficients fa and fb. For example, when the attenuation coefficients fa and fb are small values and the amount of attenuation is large, the intensities INTa and INTb are low. On the other hand, when the attenuation coefficients fa and fb are large values and the amount of attenuation is small, the intensities INTa and INTb are high. Therefore, by obtaining the ratio between the attenuation coefficients fa/fb by equation (5) above, it is possible to obtain the direction, the position, etc. in which the object is located.

More specifically, one controlled variable Ia is fixed at Im, and the other controlled variable Ib is controlled such that the ratio between the detected amounts of received lights Ga/Gb becomes 1. For example, control is performed such that the light source sections LS1 and LS2 are turned on alternately in opposite phase as shown in FIG. 12A which will be described later, the waveforms of the detected amounts of received lights are analyzed, and the other controlled variable Ib is controlled such that no detected waveform is observed (such that Ga/Gb=1). Then, by obtaining the ratio between the attenuation coefficients fa/fb based on the other controlled variable Ib=(fa/fb) at this time, the direction, the position, etc. in which the object is located are obtained.

Moreover, control may be performed such that Ga/Gb=1 and the sum of the controlled variables Ia and Ib becomes constant as in equations (6) and (7) below.

$$Ga/Gb=1 \quad (6)$$

$$Im=Ia+Ib \quad (7)$$

When equations (6) and (7) above are substituted into equation (5) above, equation (8) holds.

$$Ga/Gb = 1 = (fa/fb) \cdot (Ia/Ib) \quad (8)$$
$$= (fa/fb) \cdot \{(Im - Ib)/Ib\}$$

Based on equation (8) above, Ib is given by equation (9) below.

$$Ib=\{fa/(fa+fb)\} \cdot Im \quad (9)$$

Here, when α=fa/(fa+fb), equation (9) above is expressed as equation (10) below, and the ratio between the attenuation coefficients fa/fb is expressed as equation (11) below by using α.

$$Ib=\alpha \cdot Im \quad (10)$$

$$fa/fb=\alpha/(1-\alpha) \quad (11)$$

Therefore, when control is performed such that Ga/Gb=1 and the sum of Ia and Ib becomes a fixed value Im, α is obtained by equation (10) above based on Ib and Im, and, by substituting α thus obtained into equation (11) above, the ratio between the attenuation coefficients fa/fb can be obtained. This makes it possible to obtain the direction, the position, etc. of the object. In addition, by performing control such that Ga/Gb=1 and the sum of Ia and Ib becomes constant, it is possible to cancel out the influence etc. of the ambient light and improve the detection accuracy.

Incidentally, the descriptions heretofore deal with the technique of detecting the direction, the position, etc. in which the object is located by forming the irradiation intensity distribution LID1 of FIG. 9A and the irradiation light intensity distribution LID2 of FIG. 9B alternately. However, when a reduction in detection accuracy etc. is acceptable to some extent, it is also possible to obtain the direction, the position, etc. in which the object is located by forming only one of the irradiation light intensity distribution LID1 of FIG. 9A and the irradiation light intensity distribution LID2 of FIG. 9B.

6. Specific Configuration of Optical Detecting Device

Next, a specific configuration example of the optical detecting device will be described by using FIG. 11.

Figure 11:
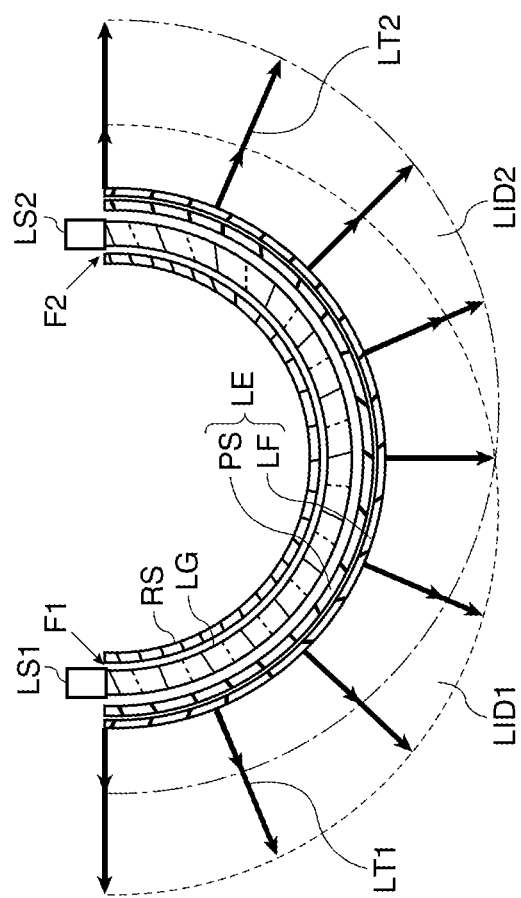
FIG. 11 shows a configuration example of the optical detecting device.

In a configuration example of FIG. 11, the light source section LS1 is provided at one end of the light guide LG as indicated by F1 of FIG. 11. Moreover, the second light source section LS2 is provided at the other end of the light guide LG as indicated by F2. As a result of the light source section LS1 emitting a source light toward the light entrance face at one end (F1) of the light guide LG, the first irradiation light intensity distribution LID1 is formed (set) in an object detection region. On the other hand, as a result of the light source section LS2 emitting a second source light toward the light entrance face at the other end (F2) of the light guide LG, the second irradiation light intensity distribution LID2 having an intensity distribution which is different from that of the first irradiation intensity distribution LID1 is formed in the detection region.

That is, in the configuration example of FIG. 11, the light source sections LS1 and LS2 are provided at the ends of the light guide LG, and the light source sections LS1 and LS2 are turned on alternately in opposite phase as shown in FIG. 12A which will be described later, whereby a state shown in FIG. 9A and a state shown in FIG. 9B are created alternately. In other words, the reflected light from the object is received by alternately forming the irradiation intensity distribution LID1 in which the intensity at one end of the light guide LG is high and the irradiation intensity distribution LID2 in which the intensity at the other end of the light guide LG is high, and the direction etc. in which the object is located is determined based on the result of the light thus received.

According to this configuration example, it is necessary simply to provide only one light guide LG. As a result, it is possible to make the optical detecting device compact, for example.

Incidentally, in FIG. 11, only one light guide LG is provided; however, in addition to the light guide LG, a second light guide may be provided. In this case, the light guide LG and the second light guide may be arranged side by side in a direction intersecting (orthogonal to) a plane along the direction in which the light guide LG and the irradiation direction setting section LE are arranged.

Moreover, the light source section LS1 of FIG. 11 is provided at one end of the light guide LG, and the light source section LS2 is provided at the other end of the second light guide.

As a result of the light source section LS1 emitting a source light toward the light entrance face at one end of the light guide LG1, the first irradiation light intensity distribution LID1 is formed in an object detection region. On the other hand, as a result of the light source section LS2 emitting a second source light toward the light entrance face at the other end of the second light guide, the second irradiation light intensity distribution LID2 having an intensity distribution which is different from that of the first irradiation intensity distribution LID1 is formed in the detection region. This configuration example has an advantage that the optical design for adjusting the light exit characteristics of the light guide can be simplified.

That is, as in the configuration example of FIG. 11, in the technique using one light guide LG, it is difficult to adjust the light exit characteristics by silk printing processing or the like. In other words, when the light exit characteristics are adjusted by processing the surface of the light guide LG such that the intensity of the irradiation light intensity distribution LID1 changes linearly, the intensity of the irradiation light intensity distribution LID2 does not change linearly. On the other hand, when the light exit characteristics are adjusted by processing the surface of the light guide LG such that the intensity of the irradiation light intensity distribution LID2 changes linearly, the intensity of the irradiation light intensity distribution LID1 does not change linearly. From this standpoint, the configuration in which two light guides are provided has the advantage that such an optical design can be simplified.

Incidentally, even if the characteristics of an intensity change become, for example, hyperbolic characteristics, not linear characteristics as shown in FIG. 10A, it is possible to deal with such situations by correction processing using software or the like. That is, even if the characteristics do not optically become linear characteristics, it is possible to make an adjustment such that the characteristics become linear characteristics by performing correction processing on the result of the received light. Therefore, when such correction processing is performed, by adopting a configuration in which only one light guide LG is provided as shown in FIG. 11 instead of providing two light guides, it is possible to make the optical detecting device compact, for example.

According to the above-described optical detecting device of this embodiment, by using a concentric curved light guide, it is possible to perform angle sensing. In addition, since the light guide has a curved shape, it is possible to make an irradiation light exit radially. As a result, it is possible to detect the direction, the position, etc. in which the object is located in a wider range as compared to a technique using a linear light guide or the like. For example, in the technique using a linear light guide, it is necessary to lengthen the light guide to make it possible to perform detection in a wide range. This undesirably makes the system large-scale. On the other hand, according to this embodiment, as shown in FIG. 8, by just placing a small-footprint irradiating section, the direction, the position, etc. in which the object is located can be detected in a wide range.

In particular, when the optical detecting device is attached to the attaching device as shown in FIG. 1, the optical detecting device is required to have a small footprint and an ability to perform detection in a wide range. The optical detecting device described in FIGS. 8 to 11 is a detecting device most suitable for being attached to the attaching device as an option.

7. Position Detection Technique

Next, an example of a technique of detecting the position of an object by using the optical detecting device of this embodiment will be described. FIG. 12A shows an example of a signal waveform about light-emitting control of the light source sections LS1 and LS2. A signal SLS1 is a light-emitting control signal for the light source section LS1, and a signal SLS2 is a light-emitting control signal for the light source section LS2. These signals SLS1 and SLS2 are opposite phase signals. Moreover, a signal SRC is a received-light signal.

For example, the light source section LS1 is turned on (emits light) when the signal SLS1 is at H level, and is turned off when the signal SLS1 is at L level. Moreover, the light source section LS2 is turned on (emits light) when the signal SLS2 is at H level, and is turned off when the signal SLS2 is at L level. Therefore, in a first period T1 of FIG. 12A, the light source section LS1 and the light source section LS2 are turned on alternately. That is, in a period in which the light source section LS1 is turned on, the light source section LS2 is turned off. As a result, the irradiation light intensity distribution LID1 shown in FIG. 9A is formed. On the other hand, in a period in which the light source section LS2 is turned on, the light source section LS1 is turned off. As a result, the irradiation light intensity distribution LID2 shown in FIG. 9B is formed.

As described above, the control section 60 of FIG. 8 performs control so as to make (turn on) the light source section LS1 and the light source section LS2 emit light in the first period T1. In addition, in the first period T1, the direction in which the object is located as seen from the optical detecting device (the irradiating section) is detected. Specifically, for example, light-emitting control is performed in the first period T1 such that Ga/Gb=1 and the sum of the controlled variables Ia and Ib becomes constant as in equations (6) and (7) described above. Then, the direction DDB in which the object OB is located as shown in FIG. 10B is obtained. For example, the ratio between the attenuation coefficients fa/fb is obtained by equations (10) and (11) above, and the direction DDB in which the object OB is located is obtained by the technique described in FIGS. 10A and 10B.

Then, in a second period T2 after the first period T1, the distance to the object OB (the distance in a direction along the direction DDB) is detected based on the result of the light received by the light receiving section RU. Based on the detected distance and the direction DDB in which the object OB is located, the position of the object is detected. That is, by obtaining the distance from the placement position PE in which the optical detecting device is placed to the object OB and the direction DDB in which the object OB is located in FIG. 10B, it is possible to determine the X and Y coordinate positions of the object OB in the X-Y plane of FIG. 8. As described above, by obtaining the distance based on the time lag between the time at which the light source is turned on and the time at which the light is received and combining the distance thus obtained with the angle result, it is possible to determine the position of the object OB.

Specifically, in FIG. 12A, time Δt between the time at which the light source sections LS1 and LS2 are made to emit light by the light emission control signals SLS1 and SLS2 and the time at which the received-light signal SRC becomes active (the time at which the reflected light is received) is detected. That is, time Δt from when the lights from the light source sections LS1 and LS2 are reflected from the object OB till when the reflected lights are received by the light receiving section RU is detected. By detecting the time Δt, it is possible to detect the distance to the object OB because the velocity of light is known. That is, the distance is obtained based on the velocity of light by measuring the time lag (the time) between the times at which the lights have arrived.

Incidentally, since the velocity of time is considerably fast, it is difficult to detect the time Δt by obtaining a simple difference by using only an electrical signal. To solve such a problem, it is preferable to modulate the light-emitting control signal as shown in FIG. 12B. Here, FIG. 12B shows a schematic signal waveform example schematically showing the intensity of light (the amount of current) by the amplitudes of the control signals SLS1 and SLS2.

Specifically, in FIG. 12B, the distance is detected by well-known continuous-wave modulation TOF (time of flight), for example. In the continuous-wave modulation TOF, a continuous light which has been intensity-modulated by continuous waves with constant periodicity is used. Then, the waveform of the reflected light is demodulated by irradiating the intensity-modulated light and receiving the reflected light multiple times at time intervals, each time interval being shorter than the modulation period, and the distance is detected by obtaining the phase difference between the irradiation light and the reflected light. Incidentally, in FIG. 12B, intensity modulation may be performed on the light corresponding to any one of the control signals SLS1 and SLS2. Moreover, instead of a clock waveform shown in FIG. 12B, a waveform modulated by continuous triangular waves or sine waves may be used. Furthermore, the distance may be detected by pulse modulation TOF using a pulse light as a light subjected to continuous modulation. The details of the distance detection technique are disclosed in JP-A-2009-8537, for example.

In FIG. 13, a modified example of the optical detecting device is shown. In FIG. 13, first and second irradiating sections EU1 and EU2 are provided. The first and second irradiating sections EU1 and EU2 are placed a given distance DS away from each other in a direction along the plane of the detection region RDET in which the object OB is detected. That is, the first and second irradiating sections EU1 and EU2 are placed a distance DS away from each other along the X-axis direction of FIG. 8.

The first irradiating section EU1 radially emits first irradiation lights with different intensities in accordance with the irradiation direction. The second irradiating section EU2 radially emits second irradiation lights with different intensities in accordance with the irradiation direction. The light receiving section RU receives a first reflected light generated as a result of the first irradiation light from the first irradiating section EU1 being reflected from the object OB and a second reflected light generated as a result of the second irradiation light from the second irradiating section EU2 being reflected from the object OB. Then, the detecting section 50 detects the position POB of the object OB based on the result of the light received by the light receiving section RU.

Specifically, the detecting section 50 detects the direction in which the object OB is located with respect to the first irradiating section EU1 as a first direction DDB1 (an angle θ1) based on the result of the received light, i.e., the first reflected light. Moreover, the detecting section 50 detects the direction in which the object OB is located with respect to the second irradiating section EU2 as a second direction DDB2 (an angle θ2) based on the result of the received light, i.e., the second reflected light. Then, the detecting section 50 obtains the position POB of the object OB based on the detected first direction DDB1 (θ1) and second direction DDB2 (θ2) and the distance DS between the first and second irradiating sections EU1 and EU2.

According to the modified example of FIG. 13, it is possible to detect the position POB of the object OB without obtaining the distance between the optical detecting device and the object OB as in FIGS. 12A and 12B.

8. Regulation of Irradiation Direction

Now, when an object such as a finger of the user is detected by setting a detection region, erroneous detection may be performed if the irradiation light from the irradiating section EU becomes a light spread in the Z direction of FIG. 8. That is, there is a possibility that the body of the user, not a finger of the user which is an object to be detected, is detected. For example, in FIG. 8, there is a possibility that, when the body of the user just approaches the screen 20, it is detected erroneously that a finger of the user which is an object to be detected is present in the detection region RDET.

It is for this reason that, in the optical detecting device of this embodiment, an irradiation direction regulating section (an irradiation direction restricting section) which regulates the irradiation direction of the irradiation light such that the irradiation light travels in a direction (a direction parallel to the projection surface) along the plane of the object detection region RDET (the plane parallel to the X-Y plane) is provided. Specifically, in FIG. 14A, the irradiation direction regulating section is implemented in the form of a slit SL. The slit SL has a first slit surface SFL1 and a second slit surface SFL2 along the plane of the detection region RDET. As described above, in this embodiment, the irradiation direction regulating section of the optical detecting device is implemented by providing the slit SL having an opening in the irradiation direction in a housing HS of the optical detecting device.

By providing such a slit SL, the light from the light guide LG is regulated so as to travel in the direction along the slit surfaces SFL1 and SFL2. In this way, it is possible to regulate the irradiation light emitted from the irradiating section EU of FIG. 8 so as to become a light parallel to the X-Y plane. This makes it possible to prevent the irradiation light toward the detection region from spreading in the Z direction and prevent the body of the user from being erroneously detected as an object such as a finger or a touch pen when the body of the user approaches the screen 20. As a result, it is possible to realize appropriate object position detection without providing a device for detecting the position in the Z direction.

Figure 14A:
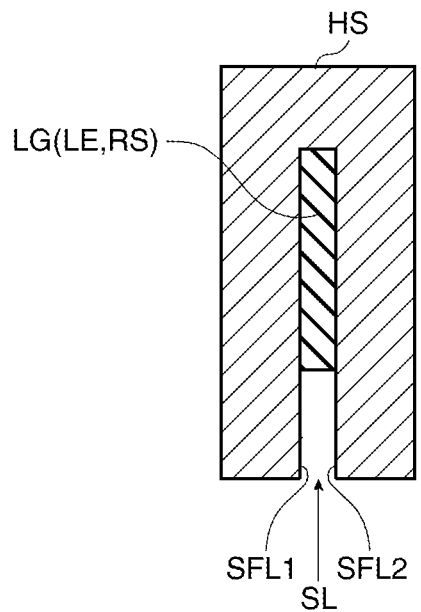
FIGS. 14A and 14B are explanatory diagrams of the irradiation direction regulating section.
Figure 14B:
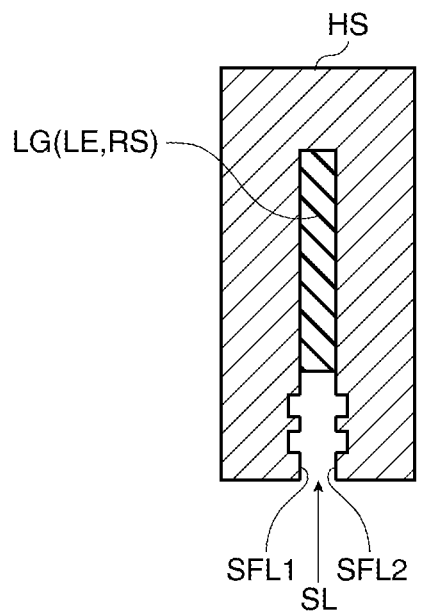

Moreover, in FIG. 14B, a depressed section is formed in the slit surfaces SFL1 and SFL2. That is, in FIG. 14A, the slit surfaces SFL1 and SFL2 are flat; in FIG. 14B, the slit surfaces SFL1 and SFL2 are not flat, but depressed. By providing such a depressed section, it is possible to prevent surface reflection on the slit surfaces SFL1 and SFL2 and make the irradiation light which is more parallel to the X-Y plane travel toward the detection region RDET.

Incidentally, it is also possible to realize the same function as the depressed section by, for example, applying nonreflective coating to the surfaces of the slit surfaces SFL1 and SFL2. Moreover, FIGS. 14A and 14B show a case in which the irradiation direction regulating section regulating deflection of the irradiation light in the Z direction is implemented in the form of the slit SL. However, the irradiation direction regulating section may be implemented by, for example, using an optical sheet such as a louver film. For example, the louver film LF of FIG. 9A has the function of regulating the direction in which the light exiting from the light guide LG travels so that the direction coincides with a normal direction. Therefore, in order to realize the same function as the function of the irradiation direction regulating section implemented in the form of the slit SL, it is necessary simply to provide a louver film placed so as to regulate the direction in which the light from the light guide LG travels so that the direction coincides with the direction parallel to the X-Y plane of FIG. 8.

Incidentally, the descriptions heretofore deal with the configuration of the optical detecting device having a curved light guide. However, the optical detecting device of this embodiment is not limited to such a configuration, and various modifications are possible. For example, the optical detecting device may be an optical detecting device using a linear light guide.

9. Detailed Structural Example of Attaching Device

Next, a detailed structural example of the attaching device of this embodiment will be described by using FIG. 15 and FIGS. 16A and 16B.

Figure 15:
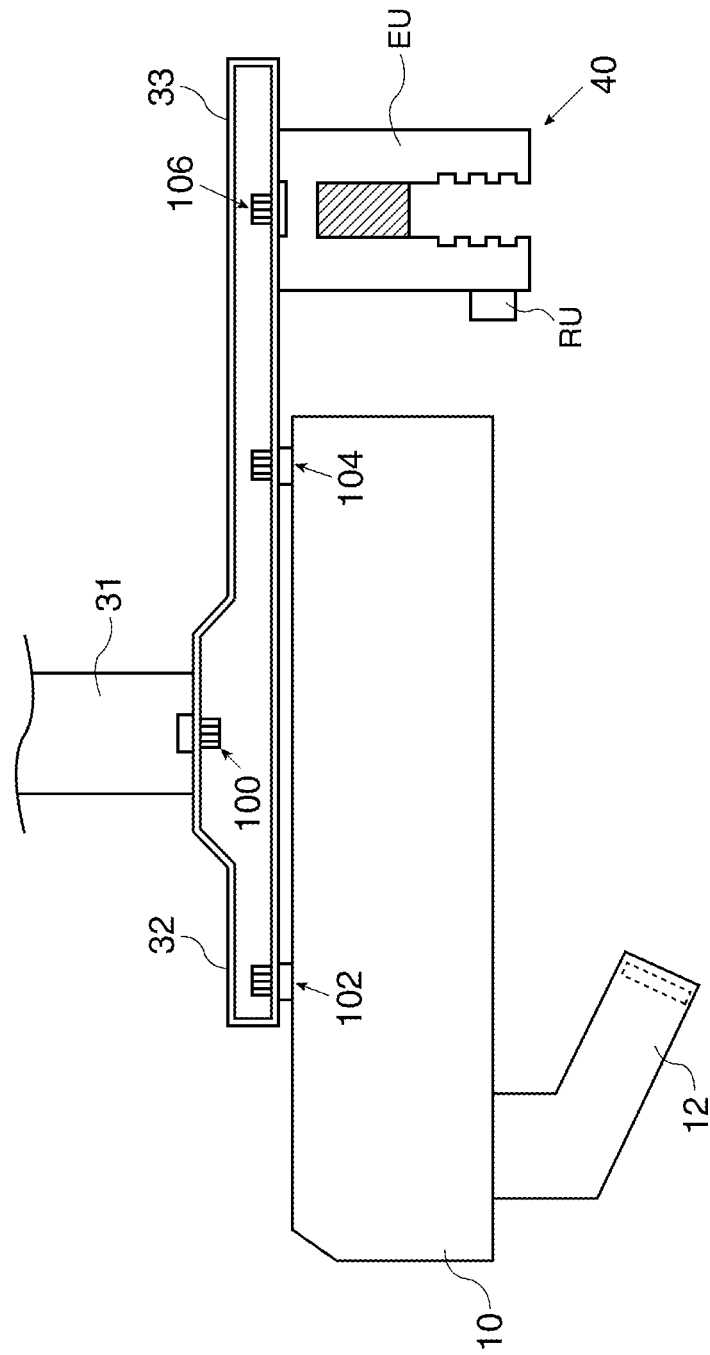
FIG. 15 is a side view showing a detailed structural example of the attaching device.

FIG. 15 is a side view of the attaching device of this embodiment, as viewed from the side thereof (from the X direction). The attaching section 31 for attaching the attaching device to the ceiling is connected and secured to the attaching section 32 by attaching fittings (screws, nuts, and the like) 100 of the attaching section 32. The image projection device 10 is connected and secured to the attaching device by attaching fittings 102 and 104 of the attaching section 32.

In FIG. 15, the attaching section 32 and the attaching section 33 are integrally formed by the base fittings. The optical detecting device 40 (the irradiating section EU) is connected and secured to the attaching device by attaching fittings 106 of the attaching section 33. Incidentally, the light receiving section RU of the optical detecting device 40 is provided between the image projection device 10 and the irradiating section EU, for example.

Figure 16A:
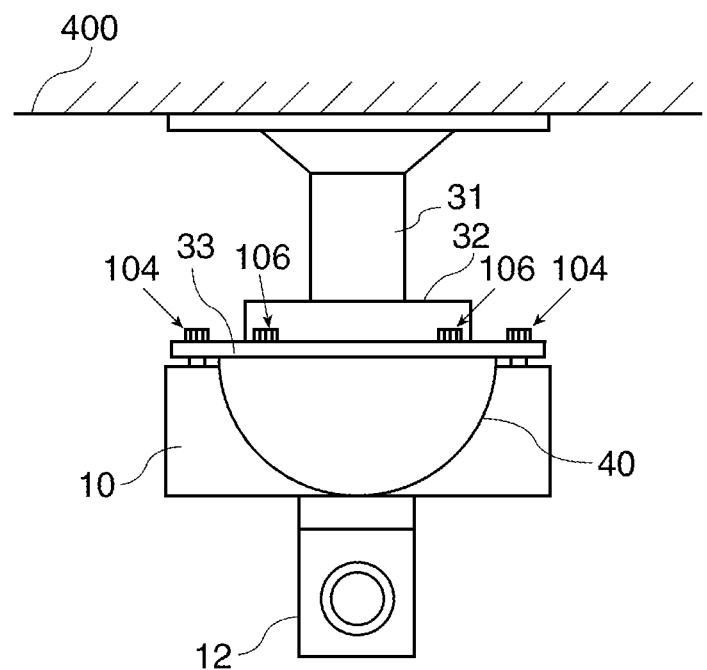
FIGS. 16A and 16B are front views showing a detailed structural example of the attaching device.

FIG. 16A is a front view of the attaching device of this embodiment, as viewed from the front (from the projection surface side). As shown in FIG. 16A, the attaching device is connected and secured to the ceiling 400 by the attaching section 31. Moreover, the optical detecting device 40 is secured to the attaching device by the attaching section 33 in such a way as to be placed between the image projection device 10 and the projection surface 22 (the wall on which the projection surface is provided).

Incidentally, FIG. 15 shows a case in which the attaching section 32 and the attaching section 33 are integrally formed by the base fittings. However, this embodiment is not limited thereto. For example, as shown in FIG. 16B, a joining section 34 (a joint) for joining the fittings of the attaching section 32 and the fittings of the attaching section 33 together may be provided. The joining section 34 is formed of attaching fittings 112 and 114 such as screws, nuts, and connecting base fittings.

Figure 16B:
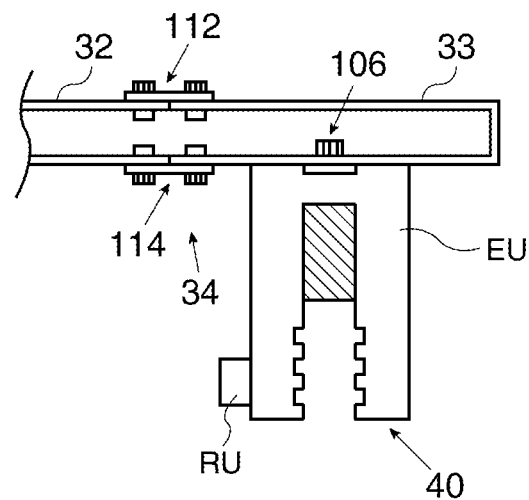

With the configuration shown in FIG. 16B, it is possible to connect the attaching section 32 and the attaching section 33 detachably by the joining section 34. Therefore, it is possible to provide the attaching device as normal ceiling-hung fittings of the image projection device 10 to the user who does not require the optical detecting device 40 by detaching the attaching section 33, for example. On the other hand, it is possible to provide the attaching device as ceiling-hung fittings with the optical detecting device to the user who requires the optical detecting device 40 by connecting the attaching section 33 by using the joining section 34.

10. Calibration

Now, in the optical detecting device 40, it is preferable to perform calibration for position detection in order to realize appropriate object position detection. It is for this reason that an I/F (interface) section 42 performing interface processing between the optical detecting device 40 and the image projection device 10 and the like is provided in the optical detecting device 40 in FIG. 17. The optical detecting device 40 transmits information for calibration to the image projection device 10 via the I/F section 42, or, in a normal detection period, transmits the detected position information to the image projection device 10 via the I/F section 42.

Figure 17:
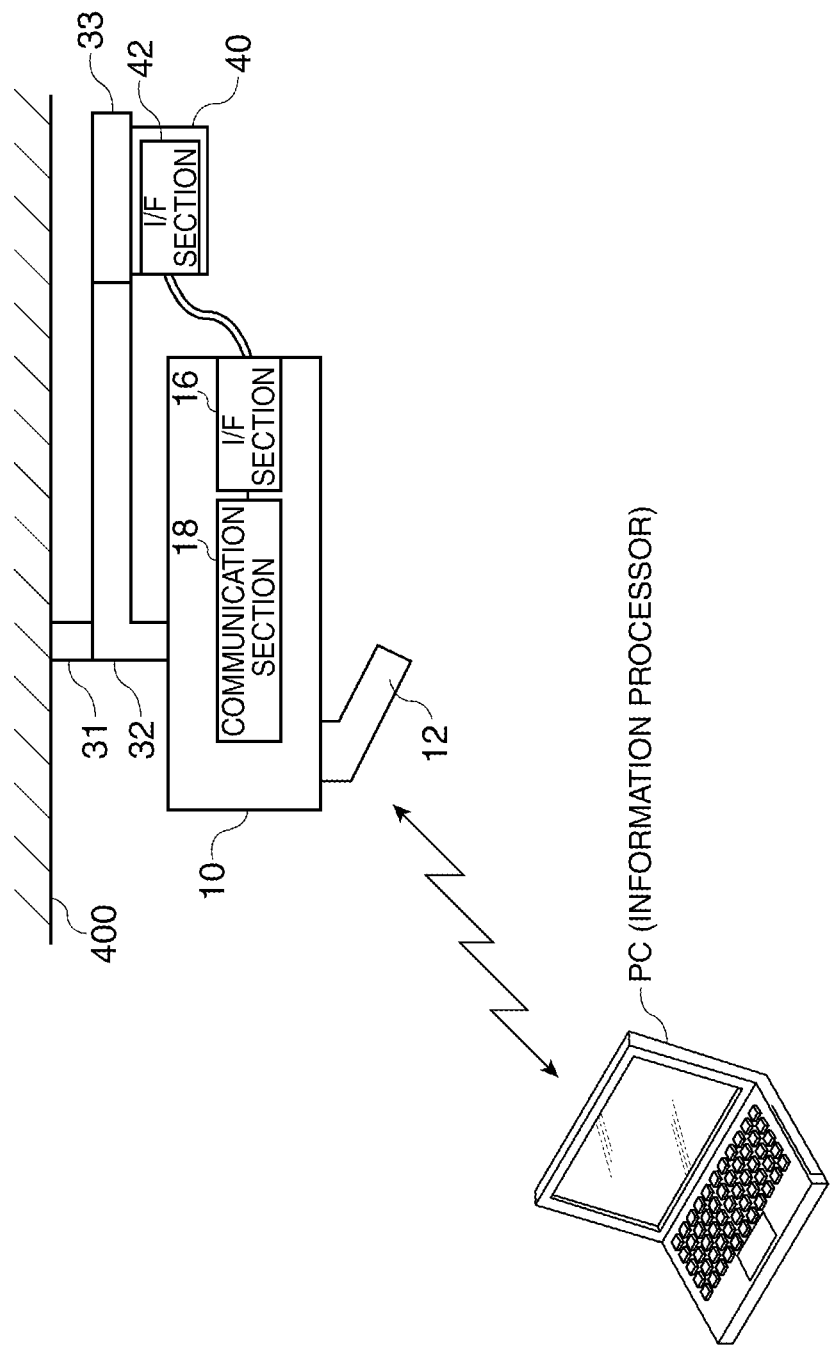
FIG. 17 is an explanatory diagram of a technique of performing calibration etc. by providing an interface section.

As shown in FIG. 17, the image projection device 10 includes an I/F section 16 and a communication section 18. The image projection device 10 receives the information for calibration from the optical detecting device 40 via the I/F section 16. Moreover, in a normal position detection period, the image projection device 10 receives the detected position information from the optical detecting device 40 via the I/F section 16. The image projection device 10 transmits the received information for calibration or the detected position information in the normal detection period to a PC (a personal computer) which is an information processor via the communication section 18. The communication section 18 may perform wired communication or may perform wireless communication such as a wireless LAN. Incidentally, the information for calibration is, for example, a program product for calibration or detected position information in a calibration period.

The I/F section 42 can be implemented by using USB (universal serial bus), for example. In this case, as shown in FIG. 17, the I/F section 42 (the USB interface) of the optical detecting device 40 is connected to the I/F section 16 of the image projection device 10 via a USB cable. By using such USB, it is possible to connect the optical detecting device 40 by using a USB terminal which is inherently provided in the image projection device 10, and thereby provide greater versatility.

Moreover, the use of USB allows the optical detecting device 40 to receive a power supply from the image projection device 10 via the I/F section 42. Specifically, the optical detecting device 40 receives a power supply from the image projection device 10 via a VBUS of USB. The optical detecting device 40 operates based on the received power supply. For example, the optical detecting device 40 makes the light emitting element emit light by using the received power supply or operates the ICs (integrated circuit devices) of the detecting section 50, the control section 60, and the like.

Incidentally, the I/F section 42 of the optical detecting device 40 is not limited to a USB interface, and a wired fast-speed serial interface other than USB may be used. In this case, it is preferable that the I/F section 42 be a fast-speed serial interface which can supply or receive a power supply. Alternatively, the I/F section 42 may be a wireless interface such as Bluetooth or a wireless LAN, not a wired interface. In addition, the optical detecting device 40 and the PC (in a broad sense, the information processor) of FIG. 17 may be so configured as to perform communication by using a wireless interface. In this case, the information for calibration or the detected position information in the normal detection period is transmitted to the PC via the wireless interface.

In this embodiment, after the image projection device 10 projects an image of a screen for calibration shown in FIG. 19C, which will be described later, on the projection surface 22, the detecting section 50 of FIG. 8 detects the position information of the object in the detection region. Then, the optical detecting device 40 transmits the detected position information of the object (in a broad sense, the information for calibration) to the image projection device 10. Specifically, the optical detecting device 40 transmits the detected position information to the image projection device 10 via the I/F section 42.

The image projection device 10 then transmits, via the communication section 18, the received position information to the PC which controls the image projection device 10. This allows the PC (the program product operating on the PC) to determine, for example, whether or not the user indicates a correct position on the screen for calibration.

Moreover, the optical detecting device 40 stores a program product for calibration, the program product for performing calibration processing, in a storing section (nonvolatile memory such as EEPROM) thereof. The optical detecting device 40 transmits the program product for calibration to the image projection device 10 via the I/F section 42.

Then, the image projection device 10 transmits the received program product for calibration to the PC via the communication section 18. This allows the PC to install the received program product for calibration and perform calibration processing by the program product for calibration. Incidentally, the detected position information or the program product for calibration may be transmitted directly to the PC via the wireless I/F section 42.

Figure 18:
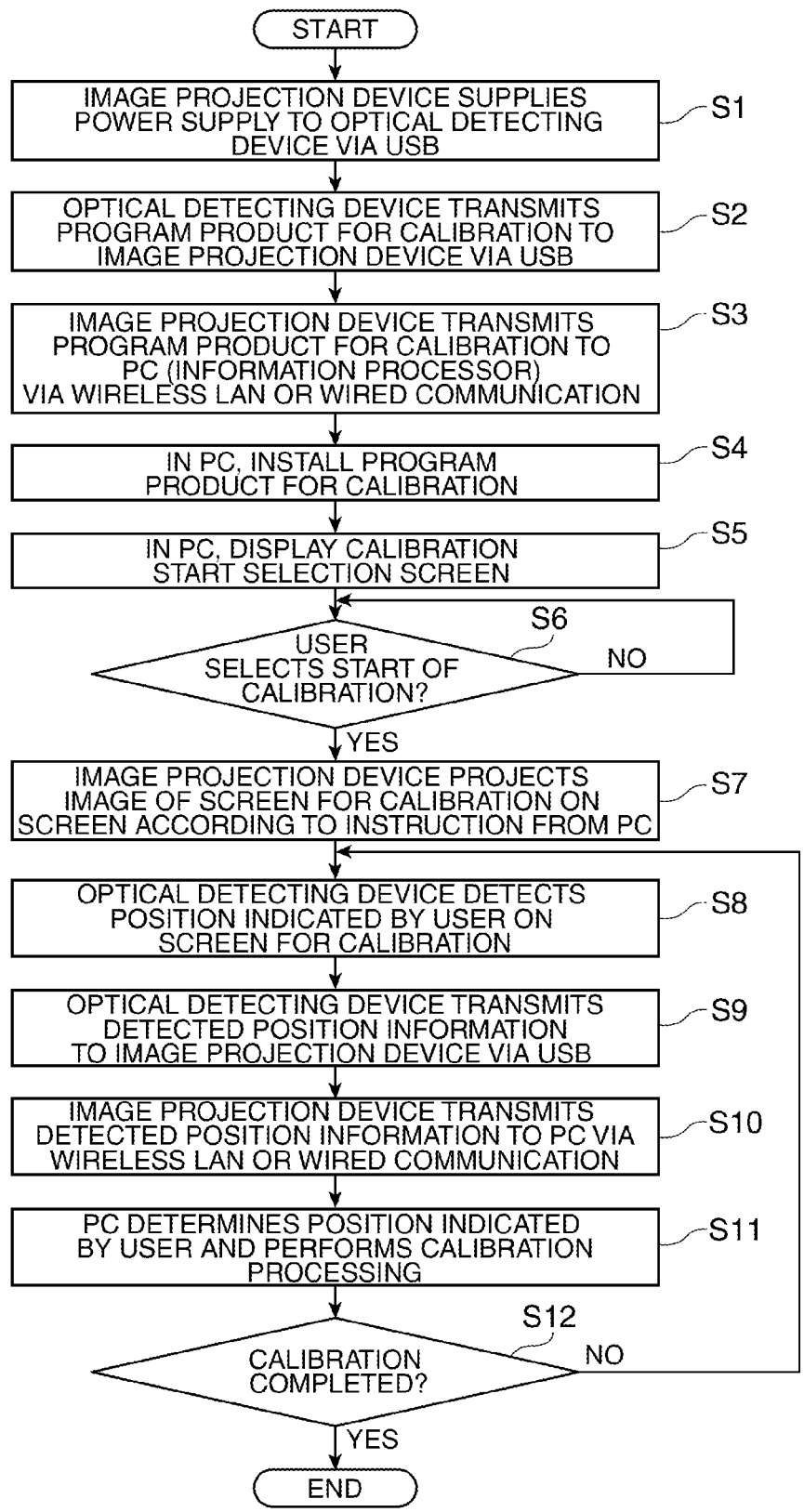
FIG. 18 is a flowchart for explaining a specific example of calibration processing.

Next, a specific example of the calibration processing of this embodiment will be described by using a flowchart of FIG. 18.

At the time of installation of the image projection device 10, the user attaches the image projection device 10 to the attaching device of this embodiment by using the attaching section 32. Moreover, the user attaches the optical detecting device 40 to the attaching device by using the attaching section 33. The user then connects the image projection device 10 and the optical detecting device 40 by using a USB cable, for example. Then, the image projection device 10 supplies a power supply to the optical detecting device 40 via USB (step S1), whereby the optical detecting device 40 starts operating.

Next, the optical detecting device 40 transmits a program product for calibration to the image projection device 10 via USB (step S2). Then, the image projection device 10 transmits the program product for calibration to the PC via a wireless LAN or wired communication (step S3).

Figure 19A:
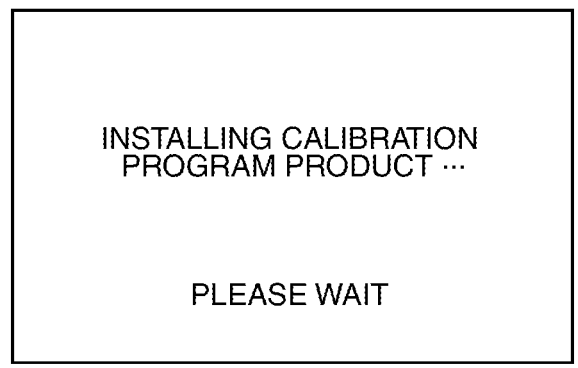
FIGS. 19A to 19C are explanatory diagrams of a calibration technique.

Next, as shown in FIG. 19A, installation of the program product for calibration is started in the PC (step S4). When the installation is finished, a calibration start selection screen shown in FIG. 19B is displayed on the display section of the PC (step S5).

Figure 19B:
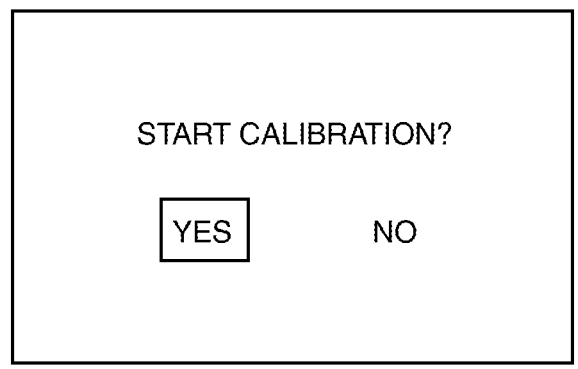
Figure 19C:
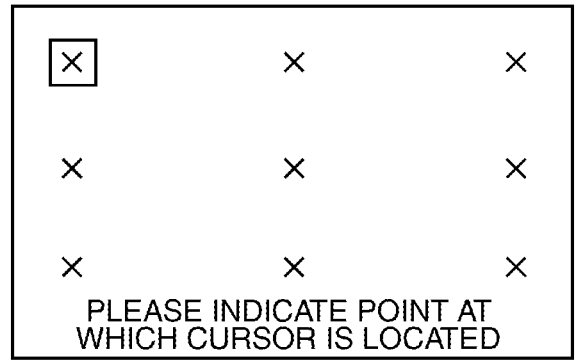

When the user selects start of calibration on the calibration start selection screen of FIG. 19B (step S6), the image projection device 10 projects an image of a screen for calibration shown in FIG. 19C on the screen 20 (the projection surface) according to an instruction from the PC (step S7). On the screen for calibration of FIG. 19C, a plurality of points to be indicated (pointed) by the user are displayed. In addition, a cursor for notifying the user of a point to be indicated by the user is also displayed. Therefore, as shown in FIG. 1, the user indicates a point at which the cursor is located by using a finger or the like. Then, the optical detecting device 40 detects a position on the screen for calibration, the position indicated by the user by using a finger or the like (step S8). That is, the optical detecting device 40 detects the X and Y coordinates of the position of the finger of the user.

The optical detecting device 40 transmits the detected position information to the image projection device 10 via USB (step S9). Then, the image projection device 10 transmits the detected position information to the PC via a wireless LAN or wired communication (step S10).

Next, the PC determines a position indicated by the user and performs calibration processing (step S11). For example, the PC compares the position of each point of FIG. 19C with the position actually indicated by the user, and performs the calibration processing for adjusting the displacement of the detected position. Then, the PC determines whether or not the calibration is completed (step S12), and repeats the processing in steps S8 to S11 until all the calibration operations are completed.

The calibration adjustment information (the information for adjusting the displacement of the detected position) obtained by the calibration processing described above is stored in the PC, for example. In a normal operation state in which the optical detecting device 40 performs normal position detection, processing for correcting the displacement of the detected position is performed based on the calibration adjustment information. Incidentally, processing for correcting the displacement of the detected position may be performed in the optical detecting device 40 by transmitting the calibration adjustment information from the PC to the optical detecting device 40 via the image projection device 10.

By doing so, it is possible to obtain the calibration adjustment information by performing the calibration processing at the time of installation of the image projection device 10. In a normal operation state after installation of the image projection device 10, it is possible to realize precise position detection by performing processing for correcting the displacement of the detected position by using the obtained calibration adjustment information.

While the embodiment has been described in detail, it will be apparent to those skilled in the art that many modifications are possible unless they substantively depart from the scope of the subject matter and the effect of the invention. Therefore, such modifications should be construed as being included in the scope of the invention. For example, a term which has been described along with a more comprehensive term or a synonymous term at least onetime in the specification or drawings can be replaced with the more comprehensive term or the synonymous term in any location in the specification or drawings. Moreover, it is to be understood that the configurations and operations of the attaching device, the optical detecting device, the projection display device, etc. are not limited to those described in the above embodiment, and may be modified in numerous ways.

The entire disclosure of Japanese Patent Application No. 2010-120205, filed May 26, 2010 is expressly incorporated by reference herein.

What is claimed is:

1. A projection display system comprising:
   an image projection device projecting an image on a projection surface;
   an optical detecting device that detects position information of an object located in a detection region which is set along the projection surface; and
   an attaching device, wherein
   the optical detecting device includes
      an irradiating section emitting an irradiation light toward the detection region,
      a light receiving section receiving a reflected light generated as a result of the irradiation light being reflected from the object, and
      a detecting section detecting the position information of the object based on the result of the light received by the light receiving section, and
   the attaching device includes
      a first attaching section that is in a bar shape elongating in a first direction, and one end of the first attaching section is attached to a support supporting the attaching device,
      a second attaching section that is in a plate shape elongating in a second direction perpendicular to the first direction, a first area in one end on a top surface of the second attaching section is connected to the other end of the first attaching section, a second area, which is opposite to the first area, in the one end on a bottom surface of the second attaching section is attached to the image projection device, and a third attaching section that is continuously provided at the other end of the second attaching section in the second direction, a third area of a bottom surface of the third attaching section is attached to the optical detecting device so that the optical detecting device is spaced apart from the image projection device in the second direction.

2. The projection display system according to claim 1, wherein
the irradiating section emits the irradiation light with different intensities in accordance with a direction in which the irradiation light is emitted.

3. The projection display system according to claim 1, wherein
the irradiating section includes
a light source section emitting a source light,
a light guide which is curved and which guides the source light from the light source section, and
an irradiation direction setting section receiving the source light exiting from an outer circumferential side of the light guide and setting an irradiation direction of the irradiation light such that the irradiation light travels from an inner circumferential side to the outer circumferential side of the light guide.

4. The projection display system according to claim 1, wherein
the optical detecting device has a first irradiating section and a second irradiating section,
the first irradiating section radially emits first irradiation light with different intensities in accordance with a direction in which the first irradiation light is emitted,
the second irradiating section radially emits second irradiation light with different intensities in accordance with a direction in which the second irradiation light is emitted,
the light receiving section receives a first reflected light generated as a result of the first irradiation light being reflected from the object and a second reflected light generated as a result of the second irradiation light being reflected from the object, and
the detecting section detects a position of the object based on the result of the first and second reflected lights received by the light receiving section.

5. The projection display system according to claim 1, wherein
the detecting section detects the position information of the object in the detection region after the image projection device projects an image for calibration on the projection surface, and
the optical detecting device transmits the detected position information of the object to the image projection device or an information processor controlling the image projection device.

6. The projection display system according to claim 5, wherein
the optical detecting device includes an interface section, and
the optical detecting device transmits information for calibration via the interface section.

7. The projection display system according to claim 6, wherein
the optical detecting device receives electric power from the image projection device via the interface section.

* * * * *